(12) United States Patent
Lim et al.

(10) Patent No.: US 11,714,514 B2
(45) Date of Patent: Aug. 1, 2023

(54) ELECTRONIC DEVICE

(71) Applicant: Samsung Display Co., Ltd., Yongin-si (KR)

(72) Inventors: Sanghyun Lim, Cheonan-si (KR); Gayoung Kim, Hwaseong-si (KR); Youngmin Park, Gwangmyeong-si (KR); Hyunjee Jeon, Hanam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/455,400

(22) Filed: Nov. 17, 2021

(65) Prior Publication Data

US 2022/0317817 A1 Oct. 6, 2022

(30) Foreign Application Priority Data

Mar. 30, 2021 (KR) .......................... 10-2021-0041465

(51) Int. Cl.
*G06F 3/044* (2006.01)

(52) U.S. Cl.
CPC .......... *G06F 3/0446* (2019.05); *G06F 3/0442* (2019.05); *G06F 3/0448* (2019.05); *G06F 2203/04112* (2013.01)

(58) Field of Classification Search
CPC .... G06F 3/0446; G06F 3/0442; G06F 3/0448; G06F 2203/04112; G06F 3/0443; G06F 3/0412; G06F 3/03545; G06F 2203/04106

See application file for complete search history.

(56) References Cited

U.S. PATENT DOCUMENTS

| | | | | |
|---|---|---|---|---|
| 8,279,194 B2 * | 10/2012 | Kent | ..................... | G06F 3/0443 345/174 |
| 8,754,662 B1 * | 6/2014 | Weng | .................... | G06F 3/0443 345/173 |
| 8,760,436 B2 * | 6/2014 | Kim | ...................... | G06F 3/0445 345/173 |
| 9,176,622 B1 * | 11/2015 | Jin | ........................ | G06F 3/0443 |
| 9,207,818 B2 | 12/2015 | Kang et al. | | |
| 2011/0025636 A1 * | 2/2011 | Ryu | ...................... | G06F 3/0445 345/173 |

(Continued)

FOREIGN PATENT DOCUMENTS

KR 10-2018-0079978 A 7/2018
KR 10-2028157 B1 10/2019

*Primary Examiner* — Amy Onyekaba
(74) *Attorney, Agent, or Firm* — Lewis Roca Rothgerber Christie LLP

(57) ABSTRACT

An electronic device includes first and second sensing electrode configured to form capacitance with each other, and sensing lines respectively connected to the first sensing electrode and the second sensing electrode, wherein the first sensing electrode includes first patterns in a main area, arranged in a first direction, and extending in a second direction crossing the first direction, a first edge pattern in an edge area that is between the main area and a peripheral area, is spaced apart from the first patterns in the first direction, and extends in the second direction, and a second edge pattern that is in the edge area, is spaced apart from the first edge pattern in the first direction, and extends in the second direction, and wherein a planar surface area of each of the first and second edge patterns is smaller than a planar surface area of each of the first patterns.

20 Claims, 15 Drawing Sheets

(56) References Cited

U.S. PATENT DOCUMENTS

| | | | |
|---|---|---|---|
| 2011/0242055 A1 | 10/2011 | Kim et al. | |
| 2014/0062933 A1* | 3/2014 | Coulson | G06F 3/0445 |
| | | | 345/174 |
| 2014/0247401 A1* | 9/2014 | Lee | G06F 3/0443 |
| | | | 349/12 |
| 2016/0147375 A1* | 5/2016 | Bok | G06F 3/0448 |
| | | | 345/175 |
| 2018/0046301 A1* | 2/2018 | Zhou | G06F 3/0445 |
| 2018/0188838 A1 | 7/2018 | An et al. | |
| 2018/0292930 A1* | 10/2018 | Lee | G06F 3/0443 |
| 2020/0019294 A1* | 1/2020 | Lee | G06F 3/0446 |
| 2020/0295092 A1* | 9/2020 | Moon | H10K 59/131 |
| 2021/0151513 A1* | 5/2021 | Lee | G06F 3/0446 |
| 2021/0240324 A1* | 8/2021 | Vandermeijden | G06F 3/0414 |
| 2022/0164053 A1* | 5/2022 | Lee | G06F 3/0446 |
| 2022/0229515 A1* | 7/2022 | Fujisawa | G06F 3/0412 |

* cited by examiner

ELECTRONIC DEVICE

CROSS-REFERENCE TO RELATED APPLICATION

This application claims priority to, and the benefit of, Korean Patent Application No. 10-2021-0041465, filed on Mar. 30, 2021, the entire contents of which are hereby incorporated by reference.

BACKGROUND

1. Field

The present disclosure herein relates to an electronic device that detects an input by a pen input device.

2. Description of the Related Art

An electronic device may detect an external input applied from outside of the electronic device. The external input may be a user's input. The user's input may include various types of external inputs, such as a part of a user's body, light, heat, a pen, and pressure. The electronic device may get to know the coordinates of a pen by using an electromagnetic resonance (EMR) method or an active electrostatic (AES) method.

SUMMARY

The present disclosure provides an electronic device that detects an input by an input device.

An embodiment of the present disclosure provide an electronic device including a first sensing electrode in an active area, a second sensing electrode in the active area, and configured to form capacitance with the first sensing electrode, and sensing lines in a peripheral area adjacent to the active area, and respectively connected to the first sensing electrode and the second sensing electrode, wherein the first sensing electrode includes first patterns in a main area of the active area, arranged in a first direction, and extending in a second direction crossing the first direction, a first edge pattern in an edge area of the active area that is between the main area and the peripheral area, is spaced apart from the first patterns in the first direction, and extends in the second direction, and a second edge pattern that is in the edge area, is spaced apart from the first edge pattern in the first direction, and extends in the second direction, and wherein a planar surface area of each of the first and second edge patterns is smaller than a planar surface area of each of the first patterns.

The second sensing electrode may include second patterns in the main area that are configured to form capacitance with the first patterns, the first edge pattern, and the second edge pattern.

The sensing lines may be respectively connected to the first patterns, the second patterns, the first edge pattern, and the second edge pattern.

The second sensing electrode may further include a third edge pattern and a fourth edge pattern that are in the edge area, that are spaced apart from the second patterns, and that each have a planar surface area that is smaller than a planar surface area of each of the second patterns.

The first edge pattern may have a different shape from that of the second edge pattern.

The first patterns may include first sensor parts arranged in the second direction and first connection parts respectively connecting the first sensor parts, wherein the first edge pattern includes first edge sensor parts arranged in the second direction, and first edge connection parts respectively connecting the first edge sensor parts, wherein the second edge pattern includes second edge sensor parts arranged in the second direction, and second edge connection parts respectively connecting the second edge sensor parts, and wherein a sum of a width in the first direction of one of the first edge sensor parts and a width in the first direction of one of the second edge sensor parts is substantially the same as a width in the first direction of one of the first sensor parts.

The first sensor parts and the first connection parts may be at a same layer.

The first sensor parts and the first connection parts may be at different layers to be connected to each other through a respective contact hole.

The sensing lines may be respectively connected to ends of the first patterns, one end of the first edge pattern, and one end of the second edge pattern.

The first sensing electrode and the second sensing electrode may respectively include a mesh-shaped conductive pattern.

The electronic device may further include a display panel including pixels overlapping the active area.

In an embodiment of the present disclosure, an electronic device includes a display panel including pixels, and an input sensor that is configured to sense an external input, and includes a first sensing electrode and a second sensing electrode that overlap the pixels when viewed in a plane, and that are configured to form mutual capacitance, wherein the first sensing electrode includes first patterns arranged in a first direction, and extending in a second direction crossing the first direction, a first edge pattern spaced apart from the first patterns in the first direction, and configured to receive a signal independent of a signal of the first patterns, and a second edge pattern spaced apart from the first edge pattern in the first direction, and configured to receive a signal independent of the signal of the first edge pattern, and wherein a width in the first direction of an area in which the first edge pattern and the second edge pattern are located is substantially the same as a width in the first direction of an area in which one of the first patterns is located.

The external input may include at least one of a user's hand or an electromagnetic pen.

The second sensing electrode may include second patterns that are arranged in the second direction, and extend in the first direction.

The second sensing electrode may further include a third edge pattern that is spaced apart from the second patterns in the second direction, extends in the first direction, and is configured to receive a signal independent of a signal of the second patterns, and a fourth edge pattern that is spaced apart from the third edge pattern in the second direction, extends in the first direction, and is configured to receive a signal independent of the signal of the third edge pattern.

The first patterns may include first sensor parts arranged in the second direction, and first connection parts connecting the first sensor parts, wherein the first edge pattern includes first edge sensor parts arranged in the second direction, and first edge connection parts connecting the first edge sensor parts, and wherein the second edge pattern includes second edge sensor parts arranged in the second direction, and second edge connection parts connecting the second edge sensor parts, and wherein a sum of a width in the first direction of one of the first edge sensor parts and a width in the first direction of one of the second edge sensor parts is substantially the same as a width in the first direction of one of the first sensor parts.

The first sensor parts and the first connection parts may be at a same layer.

The first sensor parts and the first connection parts may be at different layers to be connected to each other through a respective contact hole.

The first edge sensor parts and the second edge sensor parts may have different shapes from each other.

A planar surface area of the first edge sensor part and a planar surface area of the second edge sensor part may be smaller than a planar surface area of one of the first sensor parts.

BRIEF DESCRIPTION OF THE FIGURES

The accompanying drawings are included to provide a further understanding of the present disclosure, and are incorporated in, and constitute a part of, this specification. The drawings illustrate embodiments of the present disclosure and, together with the description, serve to describe principles of the present disclosure. In the drawings.

DETAILED DESCRIPTION

Figure 1A:
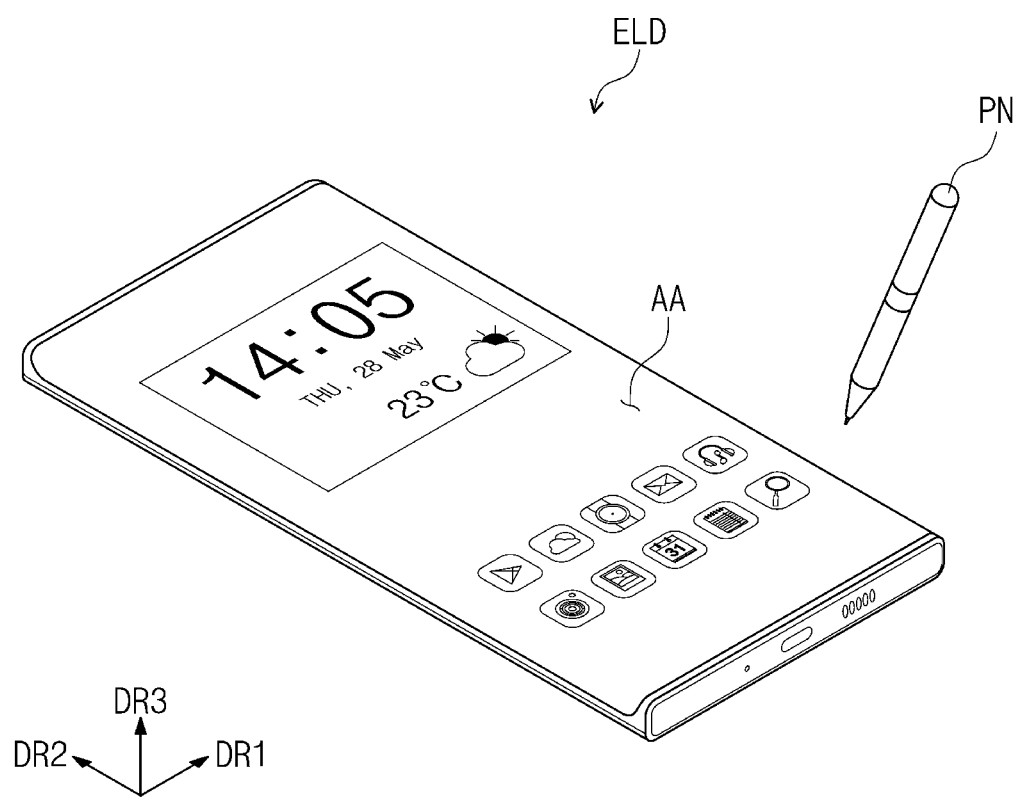
FIG. 1A to FIG. 1C are perspective views of electronic devices according to embodiments of the present disclosure.

Aspects of an embodiment of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
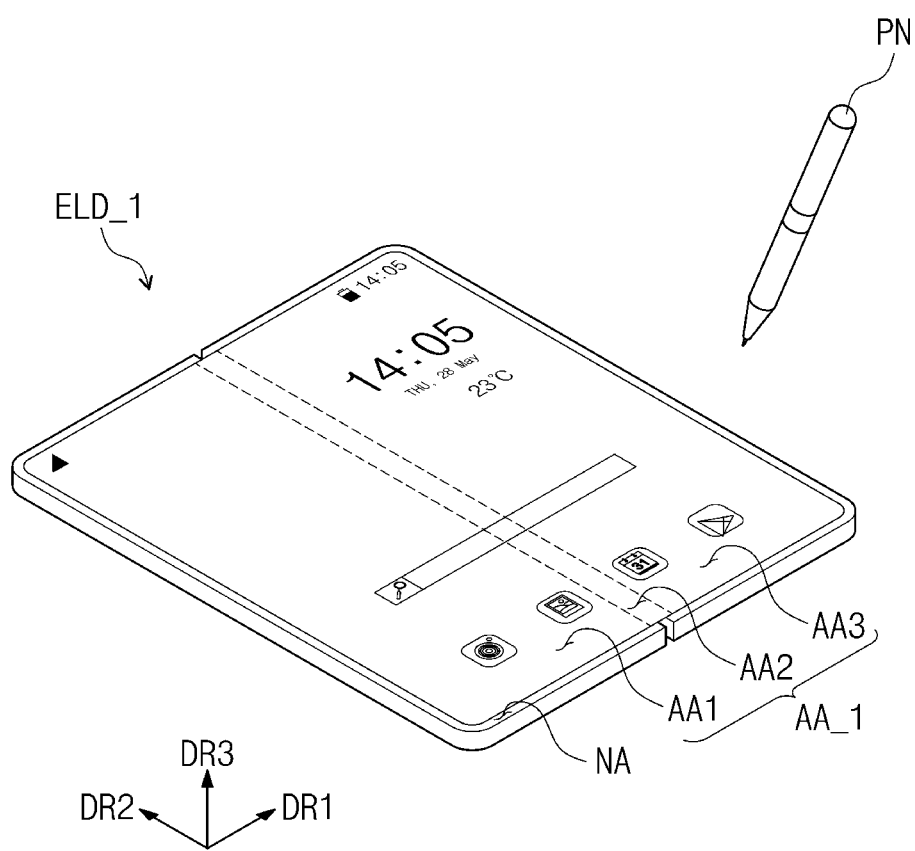
Figure 1C:
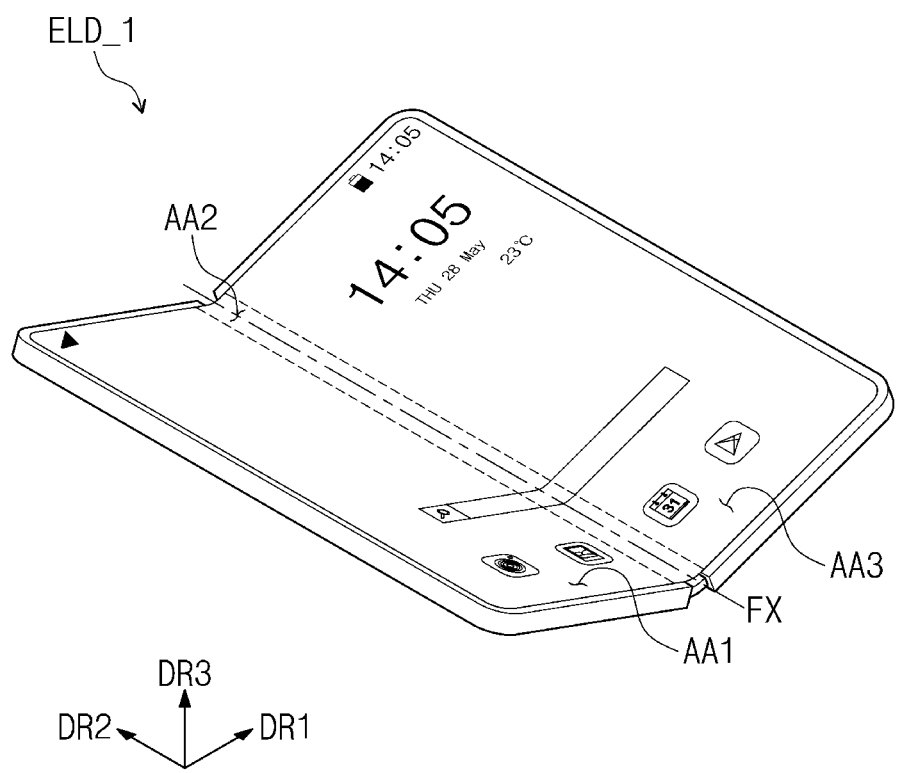

FIG. 1A to FIG. 1C are perspective views of electronic devices according to embodiments of the present disclosure.

Referring to FIG. 1A, an electronic device ELD may be a device that is activated according to an electrical signal. For example, the electronic device ELD may be a mobile phone, a tablet, a car navigation device, a game machine, or a wearable device, but the electronic device ELD is not limited thereto. FIG. 1A illustrates the electronic device ELD as a mobile phone only as an example.

The electronic device ELD may display an image through an active area AA. The active area AA may include a surface defined by a first direction DR1 and a second direction DR2.

A thickness direction of the electronic device ELD may be parallel to a third direction DR3 crossing the first direction DR1 and the second direction DR2. Accordingly, a front surface (or a top surface) and a rear surface (or a bottom surface) of each of members constituting the electronic device ELD may be defined on the basis of the third direction DR3.

The electronic device ELD may detect an external input applied from outside of the electronic device ELD. The external input may include a variety of types. For example, the external input may include various types of external inputs, such as a part of a user's body (hereinafter referred to as a touch), an input device PN, light, heat, and/or pressure, and may include an external input that is applied in direct contact with the active area AA or that is applied while spaced apart from the active area AA (e.g., at a predetermined distance). Meanwhile, the external input in an embodiment may be an input by a user.

The electronic device ELD illustrated in FIG. 1A may detect an input by a user's touch and may detect an input by the input device PN. The input device PN may refer to a device other than a user's body. For example, the input device PN may be an active pen, a stylus pen, a touch pen, or an electronic pen. Hereinafter, the input device PN is described as an active pen.

The electronic device ELD and the input device PN may perform two-way communication. The electronic device ELD may provide an uplink signal to the input device PN. For example, the uplink signal may include a synchronization signal or information about the electronic device ELD, but is not particularly limited thereto. The input device PN may provide a downlink signal to the electronic device ELD. The downlink signal may include a synchronization signal or may include state information of the input device PN. For example, the downlink signal may include coordinate information of the input device, battery information of the input device, tilt information of the input device, and/or various pieces of information stored in the input device, but the downlink signal is not particularly limited thereto.

Referring to FIG. 1B and FIG. 1C, an electronic device ELD_1 may be folded or unfolded. Accordingly, an active area AA_1 in which an image is displayed may also be folded or unfolded. When the electronic device ELD_1 is unfolded, the active area AA_1 may include a plane defined by a first direction DR1 and a second direction DR2.

The active area AA_1 may include a first area AA1, a second area AA2, and a third area AA3. The second area AA2 may be bent about a folding axis FX extending in the second direction DR2. Accordingly, the first area AA1 and the third area AA3 may be referred to as non-folding areas, and the second area AA2 may be referred to as a folding area.

When the electronic device ELD_1 is folded, the first area AA1 and the third area AA3 may face each other, which may be referred to as in-folding. Accordingly, in a fully folded state, the active area AA_1 might not be exposed to the outside. However, this is merely an example, and the operation of the electronic device ELD_1 is not limited thereto.

For example, in an embodiment of the present disclosure, the first area AA1 and the third area AA3 may be opposing each other when the electronic device ELD_1 is folded, which may be referred to as out-folding. Accordingly, in a folded state, the active area AA_1 may be exposed to the outside.

In an embodiment, the electronic device ELD_1 may perform only one of in-folding and out-folding operations. Alternatively, in other embodiments, the electronic device ELD_1 may perform both the in-folding and out-folding operations. In this case, the same area of the electronic device ELD_1, for example, the second area AA2, may be in-folded and out-folded.

Although one folding area and two non-folding areas are illustrated as an example in FIG. 1B and FIG. 1C, the number of each of folding areas and non-folding areas is not limited thereto. For example, the electronic device ELD_1 may include more than two non-folding areas and a plurality of folding areas respectively located between adjacent non-folding areas.

Although FIG. 1B and FIG. 1C illustrate the folding axis FX extending in the second direction DR2, an embodiment of the present disclosure are not limited thereto. For example, the folding axis FX may extend in a direction parallel to the first direction DR1. In this case, the first area AA1, the second area AA2, and the third area AA3 may be sequentially arranged along the second direction DR2.

The active area AA_1 may overlap one or more electronic modules. For example, the electronic modules may include a camera module, a proximity illuminance sensor, and the like. The electronic modules may receive an external input transmitted through the active area AA_1, or may provide an output through the active area AA_1. A portion of the active area AA_1 overlapping the camera module, the proximity illuminance sensor, and/or the like may have a higher transmittance than another portion of the active area AA_1. Accordingly, it is not necessary to provide, in a peripheral area NA around the active area AA_1, an area in which the plurality of electronic modules are to be located. As a result, a surface area ratio of the active area AA_1 to a front surface of the electronic device ELD_1 may increase.

The electronic device ELD_1 and an input device PN may perform two-way communication. The electronic device ELD_1 may provide an uplink signal to the input device PN. The input device PN may provide a downlink signal to the electronic device ELD_1. The electronic device ELD_1 may detect coordinates of the input device PN by using the signal provided from the input device PN. However, this is described by way of example, and the input device PN may also operate in a manner of one-way communication toward the electronic device ELD_1 and is not limited to any one embodiment.

FIG. 2A to FIG. 2D are cross-sectional views of electronic devices according to one or more embodiments of the present disclosure. Hereinafter, an embodiment of the present disclosure will be described with reference to FIG. 2A to FIG. 2D.

Figure 2A:
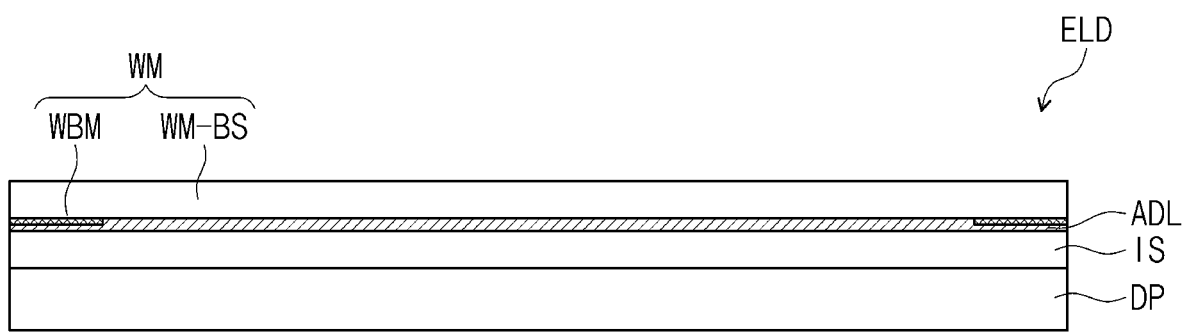
FIG. 2A to FIG. 2D are cross-sectional views of electronic devices according to embodiments of the present disclosure.

As illustrated in FIG. 2A, the electronic device ELD may include a display panel DP, an input sensor IS, and a window WM. The window WM may be located on the display panel DP and the input sensor IS to be bonded thereto through an adhesive layer ADL.

The window WM may include a base layer WM-BS and a light blocking pattern WBM. The base layer WM-BS may be optically transparent. For example, the base layer WM-BS may include glass, plastic, or film.

The light blocking pattern WBM is a colored organic film and may be formed on one surface of the base layer WM-BS in, for example, a coating method. However, this is illustrated only as an example, and the light blocking pattern WBM may be inserted into the base layer WM-BS or may be omitted.

The display panel DP may generate an image. The image includes a still image and a moving image. The display panel DP is not particularly limited and may be, for example, a light emitting display panel such as an organic light emitting display panel and a quantum dot light emitting display panel.

Referring to FIG. 2A, the input sensor IS may be directly located on the display panel DP. According to an embodiment of the present disclosure, the input sensor IS may be formed on the display panel DP by a continuous process. That is, when the input sensor IS is directly located on the display panel DP, an adhesive layer between the input sensor IS and the display panel DP may be omitted.

Figure 2B:
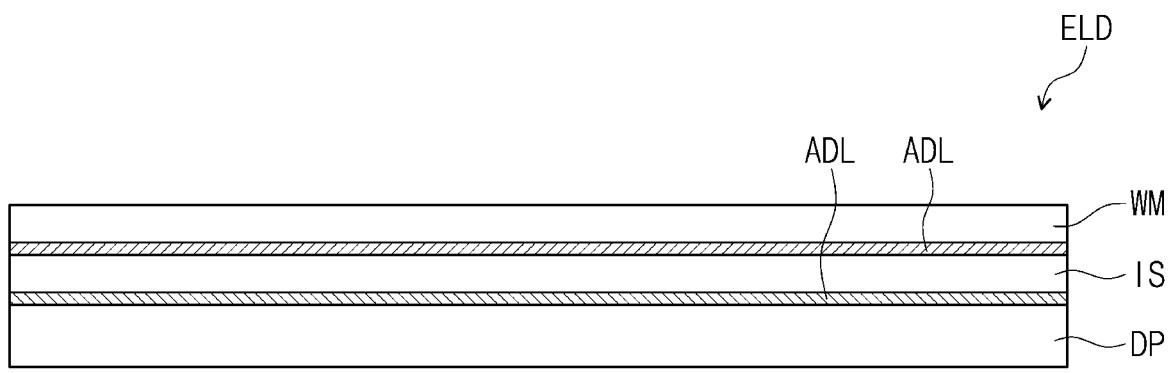

Alternatively, as illustrated in FIG. 2B, an adhesive layer ADL may be located between an input sensor IS and a display panel DP in an embodiment. In this case, the input sensor IS is not manufactured together with the display panel DP by a continuous process, but the input sensor IS may be manufactured through a process that is separate from that of the display panel DP, and then may be fixed to a top surface of the display panel DP by the adhesive layer ADL (e.g., one of the adhesive layers ADL).

Figure 2C:
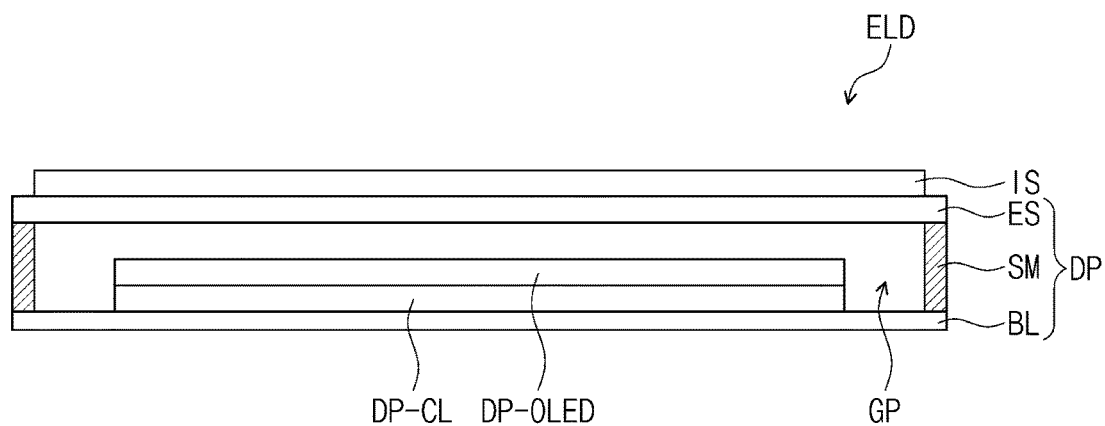

As illustrated in FIG. 2C, the display panel DP may include a base layer BL, and a circuit element layer DP-CL, a display element layer DP-OLED, and an encapsulation substrate ES that are located on the base layer BL, and may also include a sealant SM for coupling the base layer BL and the encapsulation substrate ES.

The base layer BL may include at least one plastic film. The base layer BL may include a plastic substrate, a glass substrate, a metal substrate, or an organic/inorganic composite material substrate. In an embodiment, the base layer BL may be a thin film glass substrate having a thickness of tens to hundreds of micrometers. The base layer BL may have a multilayer structure. For example, the base layer BL may include a polyimide film/at least one inorganic layer/a polyimide film.

The circuit element layer DP-CL includes at least one insulating layer and a circuit element. The insulating layer includes at least one inorganic layer and at least one organic layer. The circuit element includes signal lines, a pixel driving circuit, and the like. A detailed description thereof will be given later.

The display element layer DP-OLED includes at least a light emitting element. The display element layer DP-OLED may further include an organic layer such as a pixel defining film.

The encapsulation substrate ES may be spaced apart from the display element layer DP-OLED with a gap (e.g., a predetermined gap) GP therebetween. The base layer BL and the encapsulation substrate ES may include a plastic substrate, a glass substrate, a metal substrate, or an organic/inorganic composite material substrate. The sealant SM may include an organic adhesive, frit, or the like. The gap GP may be filled with a material (e.g., a predetermined material). The gap GP may be filled with a desiccant or a resin material.

Figure 2D:
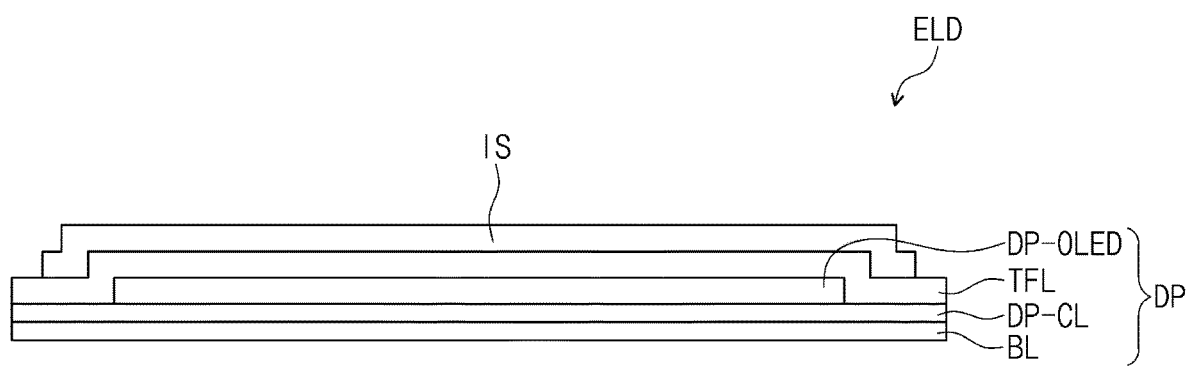

As illustrated in FIG. 2D, a display panel DP includes a base layer BL, and a circuit element layer DP-CL, a display element layer DP-OLED, and an upper insulating layer TFL that are located on the base layer BL. The upper insulating layer TFL may include a plurality of thin films. The upper insulating layer TFL may include a protection layer for protecting a light emitting element. The upper insulating layer TFL may include a thin film encapsulation layer including at least an inorganic layer/an organic layer/an inorganic layer. The thin film encapsulation layer may be located on the protection layer.

Figure 3:
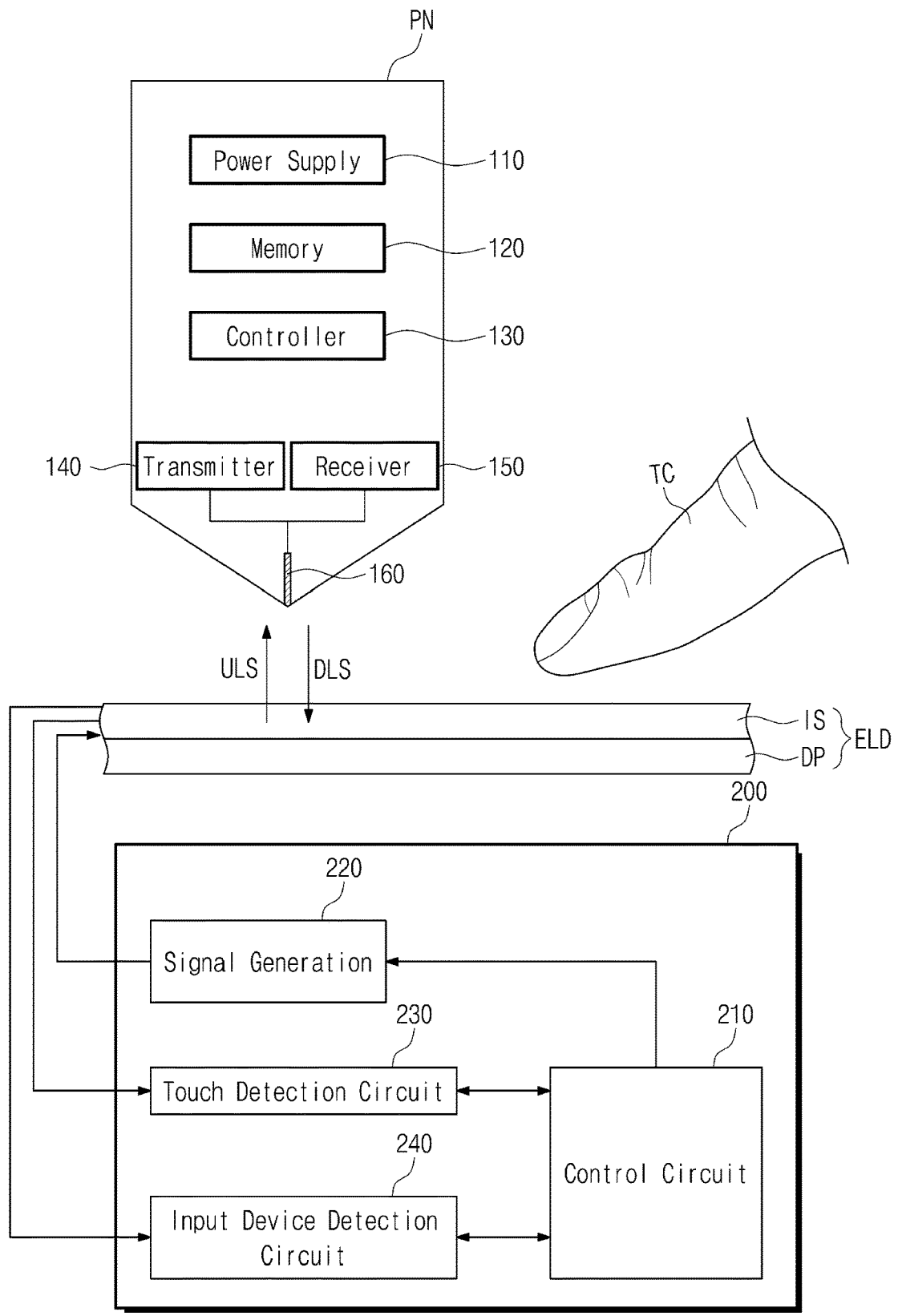
FIG. 3 is a block diagram schematically illustrating an electronic device and an input device according to an embodiment of the present disclosure.

FIG. 3 is a block diagram schematically illustrating an electronic device and an input device according to an embodiment of the present disclosure. Referring to FIG. 3, the electronic device ELD may include the display panel DP, the input sensor IS, and a sensor control circuit 200.

The input sensor IS may be driven in a time division method. For example, the input sensor IS may be driven in a first mode and in a second mode that are alternately repeated. The first mode may be a mode in which an input by a touch TC is sensed, and the second mode may be a mode in which an input by the input device PN is sensed. The first mode may be a mode in which the touch TC is sensed on the basis of a change in mutual capacitance, and the second mode may be a mode in which an input by the input device PN is sensed on the basis of a change in capacitance.

The sensor control circuit 200 may provide a signal to the input sensor IS, or may receive a sensing signal from the input sensor IS. The sensor control circuit 200 may include a control circuit 210, a signal generation circuit 220, a touch detection circuit 230, and an input device detection circuit 240.

The names of the control circuit 210, the signal generation circuit 220, the touch detection circuit 230, and the input device detection circuit 240 are defined according to operations thereof. Accordingly, the control circuit 210, the signal generation circuit 220, the touch detection circuit 230, and the input device detection circuit 240 may be implemented in a single chip, or some of the control circuit 210, the signal generation circuit 220, the touch detection circuit 230, and the input device detection circuit 240 may be implemented in a chip that is different from that in which one or more of the others thereof are implemented.

The control circuit 210 may control operations of the signal generation circuit 220, the touch detection circuit 230, and the input device detection circuit 240. The signal generation circuit 220 may provide the signal to the input sensor IS. The touch detection circuit 230 may receive the sensing signal from the input sensor IS in the first mode. The input device detection circuit 240 may receive the sensing signal from the input sensor IS in the second mode.

When the second mode starts, the input sensor IS may provide an uplink signal ULS to the input device PN. When the input device PN receives the uplink signal ULS and is synchronized with the electronic device ELD, the input device PN may provide a downlink signal DLS toward the input sensor IS.

The input device PN may include a power supply 110, memory 120, a controller 130, a transmitter 140, a receiver 150, and a pen tip 160. However, components constituting the input device PN are not limited to the components listed above. For example, the input device PN may further include an electrode switch for switching the pen tip 160 between a signal transmitting mode and a signal receiving mode, a pressure sensor for sensing pressure, a rotation sensor for sensing rotation, and/or the like.

The power supply 110 may include a battery or a high-capacity capacitor that supplies power to the input device PN. The memory 120 may store function information of the input device PN. The controller 130 may control an operation of the input device PN. Each of the transmitter 140 and the receiver 150 may perform communication with the electronic device ELD through the pen tip 160. The transmitter 140 may be referred to as a signal generator or a transmitting circuit, and the receiver 150 may be referred to as a signal receiver or a receiving circuit. Meanwhile, the description above is given only as an example, and at least one of the components constituting the input device PN may be omitted in other embodiments. Alternatively, the input device PN may further include another component in addition to the illustrated components, and is not limited to any one embodiment.

Figure 4:
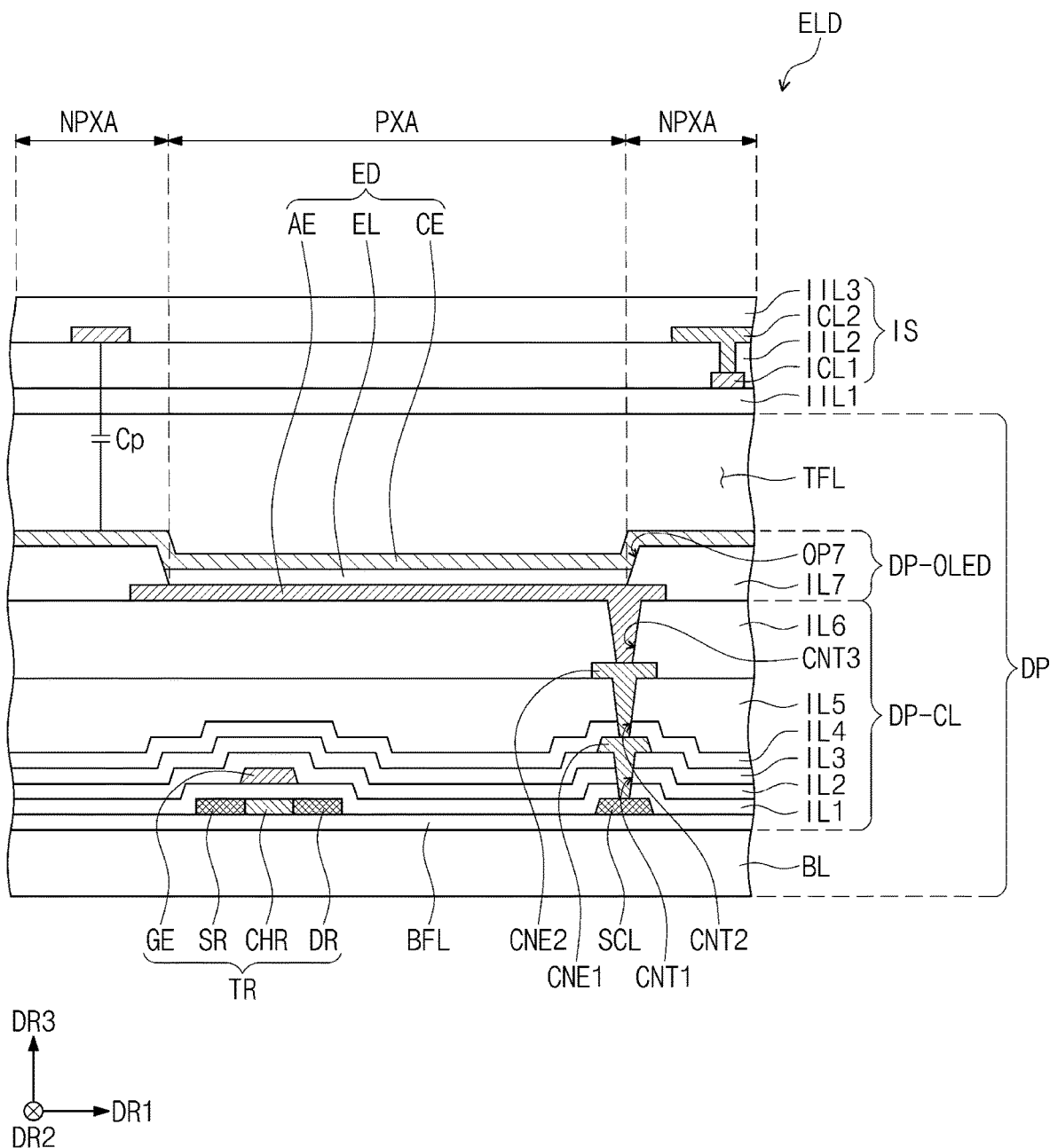
FIG. 4 is a cross-sectional view illustrating a portion of an electronic device according to an embodiment of the present disclosure.

FIG. 4 is a cross-sectional view illustrating a portion of an electronic device according to an embodiment of the present disclosure.

Referring to FIG. 4, the electronic device ELD may include the display panel DP and the input sensor IS directly located on the display panel DP. The display panel DP may include the base layer BL, the circuit element layer DP-CL, the display element layer DP-OLED, and the upper insulating layer TFL.

The base layer BL may provide a base surface on which the circuit element layer DP-CL is located. The circuit element layer DP-CL may be located on the base layer BL. The circuit element layer DP-CL may include an insulating layer, a semiconductor pattern, a conductive pattern, a signal line, and the like. The insulating layer, a semiconductor layer, and a conductive layer may be formed on the base layer BL in a method such as coating and deposition, and thereafter, the insulating layer, the semiconductor layer, and the conductive layer may be selectively patterned through one or more instances of a photolithography process. Thereafter, the semiconductor pattern, the conductive pattern, and the signal line included in the circuit element layer DP-CL may be formed.

At least one inorganic layer is formed on a top surface of the base layer BL. In an embodiment, the display panel DP is illustrated to include a buffer layer BFL. The buffer layer BFL may improve the bonding force between the base layer BL and the semiconductor pattern. The buffer layer BFL may include a silicon oxide layer and a silicon nitride layer, and the silicon oxide layer and the silicon nitride layer may be alternately laminated.

The semiconductor pattern may be located on the buffer layer BFL. The semiconductor pattern may include polysilicon. However, the semiconductor pattern is not limited thereto and may include amorphous silicon or metal oxide. The semiconductor pattern may be provided in plurality.

FIG. 4 illustrates only some of the semiconductor patterns, and some other of the semiconductor patterns may be further located in another area. The semiconductor patterns may be arranged (e.g., according to a specific design) across pixels. The semiconductor pattern may have different electrical properties depending on whether the same is doped. The semiconductor pattern may include a first region having a high conductivity, and may include a second region having a low conductivity. The first region may be doped with an N-type dopant or a P-type dopant. A P-type transistor includes a doped region doped with the P-type dopant. The second region may be a non-doped region, or may be a region doped in a lower concentration than the first region.

The first region has a higher conductivity than the second region, and may substantially serve as an electrode or a signal line. The second region may substantially correspond to an active region (or a channel region) of a transistor TR. In other words, one portion of the semiconductor pattern may be the active region of the transistor, and another portion thereof may be a source region or a drain region of the transistor.

Each of the pixels may have an equivalent circuit including seven transistors, one capacitor, and the light emitting element, and an equivalent circuit diagram of the pixel may be modified into various forms. In FIG. 4, one transistor TR and a light emitting element ED included in the pixel are illustrated only as an example.

A source region SR, a channel region CHR, and a drain region DR of the transistor TR may be formed from the semiconductor pattern. The source region SR and the drain region DR may be adjacent the channel region CHR, in opposite respective directions, when viewed on a cross section. FIG. 4 illustrates a portion of a signal line SCL formed as, or similarly to, the first region of the semiconductor pattern. In an embodiment, the signal line SCL may be electrically connected to the transistor TR when viewed in a plane.

A first insulating layer IL1 may be located on the buffer layer BFL. The first insulating layer IL1 may overlap the plurality of pixels in common, and may cover the semiconductor pattern. The first insulating layer IL1 may be an inorganic layer and/or an organic layer, and may have a single-layer structure or a multilayer structure. The first insulating layer IL1 may include at least one of aluminum oxide, titanium oxide, silicon oxide, silicon nitride, silicon oxynitride, zirconium oxide, or hafnium oxide. In an embodiment, the first insulating layer IL1 may be a single-layer silicon oxide layer. In addition to the first insulating layer IL1, an insulating layer of the circuit element layer DP-CL (to be described later) may be an inorganic layer and/or an organic layer, and may have a single-layer structure or a multilayer structure. The inorganic layer may include at least one of the above-described materials, but is not limited thereto.

A gate GE of the transistor TR is located on the first insulating layer IL1. The gate GE may be a portion of a metal pattern. The gate GE overlaps the channel region CHR. In a process of doping the semiconductor pattern, the gate GE may function as a mask.

A second insulating layer IL2 may be located on the first insulating layer IL1, and may cover the gate GE. The second insulating layer IL2 may overlap, or may be overlapped by, the pixels in common. The second insulating layer IL2 may be an inorganic layer and/or an organic layer, and may have a single-layer structure or a multilayer structure. In an embodiment, the second insulating layer IL2 may be a single-layer silicon oxide layer.

A third insulating layer IL3 may be located on the second insulating layer IL2, and in an embodiment, the third insulating layer IL3 may be a single-layer silicon oxide layer. A first connection electrode CNE1 may be located on the third insulating layer IL3. The first connection electrode CNE1 may be connected to the signal line SCL through a contact hole CNT1 penetrating the first, second, and third insulating layers IL1, IL2, and IL3.

A fourth insulating layer IL4 may be located on the third insulating layer IL3. The fourth insulating layer IL4 may be a single-layer silicon oxide layer. A fifth insulating layer IL5 may be located on the fourth insulating layer IL4. The fifth insulating layer IL5 may be an organic layer.

A second connection electrode CNE2 may be located on the fifth insulating layer IL5. The second connection electrode CNE2 may be connected to the first connection electrode CNE1 through a contact hole CNT2 penetrating the fourth insulating layer IL4 and the fifth insulating layer IL5.

A sixth insulating layer IL6 may be located on the fifth insulating layer IL5 and may cover the second connection electrode CNE2. The sixth insulating layer IL6 may be an organic layer. The display element layer DP-OLED may be located on the circuit element layer DP-CL. The display element layer DP-OLED may include the light emitting element ED. The light emitting element ED may include a first electrode AE, a light emitting layer EL, and a second electrode CE. For example, the light emitting layer EL may include an organic light emitting material, a quantum dot, a quantum rod, a micro-LED, or a nano-LED.

The first electrode AE may be located on the sixth insulating layer IL6. The first electrode AE may be connected to the second connection electrode CNE2 through a contact hole CNT3 penetrating the sixth insulating layer IL6.

A pixel defining film IL7 may be located on the sixth insulating layer IL6 and may cover a portion of the first electrode AE. An opening OP7 is defined in the pixel defining film IL7. The opening OP7 of the pixel defining film IL7 exposes at least a portion of the first electrode AE. In an embodiment, a light emitting area PXA is defined to correspond to the portion of the first electrode AE exposed by the opening OP7. A non-light emitting area NPXA may surround the light emitting area PXA.

The light emitting layer EL may be located on the first electrode AE. The light emitting layer EL may be located in the opening OP7. The light emitting layer EL may be provided in plurality. That is, the light emitting layers EL may be formed separately in the pixels, respectively. When the light emitting layers EL are respectively formed separately in the pixels, each of the light emitting layers EL may emit light having at least one of blue, red, or green. However, the light emitting layer EL is not limited thereto, and may be connected to the pixels and provided in common. In this case, the light emitting layer EL may provide blue light or white light.

The second electrode CE may be located on the light emitting layer EL. The second electrode CE may have an integral shape, and may be located in common in the plurality of pixels. A common voltage may be provided to the second electrode CE, and the second electrode CE may be referred to as a common electrode.

In an embodiment, a hole control layer may be located between the first electrode AE and the light emitting layer EL. The hole control layer may be located in common in the light emitting area PXA and the non-light emitting area NPXA. The hole control layer may include a hole transport layer, and may further include a hole injection layer. An electron control layer may be located between the light emitting layer EL and the second electrode CE. The electron control layer may include an electron transport layer, and may further include an electron injection layer. The hole control layer and the electron control layer may be formed in common in the pixels by using an open mask.

The input sensor IS may be directly formed on a top surface of the upper insulating layer TFL through a continuous process. The input sensor IS may include a first sensor insulating layer IIL1, a first conductive layer ICL1, a second sensor insulating layer IIL2, a second conductive layer ICL2, and a third sensor insulating layer IIL3. The first sensor insulating layer IIL1 may be omitted in an embodiment of the present disclosure.

Each of the first conductive layer ICL1 and the second conductive layer ICL2 may include a plurality of patterns having a single-layer structure or a multilayer structure laminated in the third direction DR3. The conductive layer of the single-layer structure may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowires, graphene, and the like.

The conductive layer of the multilayer structure may include metal layers. The metal layers may have, for example, a three-layer structure of titanium/aluminum/titanium. The conductive layer of the multilayer structure may include at least one metal layer and at least one transparent conductive layer.

The second sensor insulating layer IIL2 covers the first conductive layer ICL1, and the third sensor insulating layer IIL3 covers the second conductive layer ICL2. The first to third sensor insulating layers IIL1 to IIL3 are each illustrated as a single layer, but are not limited thereto.

At least one of the first sensor insulating layer IIL1 or the second sensor insulating layer IIL2 may include an inorganic film. The inorganic film may include at least one of aluminum oxide, titanium oxide, silicon oxide, silicon nitride, silicon oxynitride, zirconium oxide, or hafnium oxide.

The third sensor insulating layer IIL3 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, or perylene-based resin.

As the distance between the display element layer DP-OLED and the input sensor IS decreases, the input sensor IS may be more affected by a signal provided from the display element layer DP-OLED. Capacitance of a load capacitor Cp formed between the second electrode CE and the first conductive layer ICL1 and/or the second conductive layer ICL2 changes according to the operation of the display element layer DP-OLED. An interfering signal from the display element layer DP-OLED may function as noise to the input sensor IS.

Figure 5A:
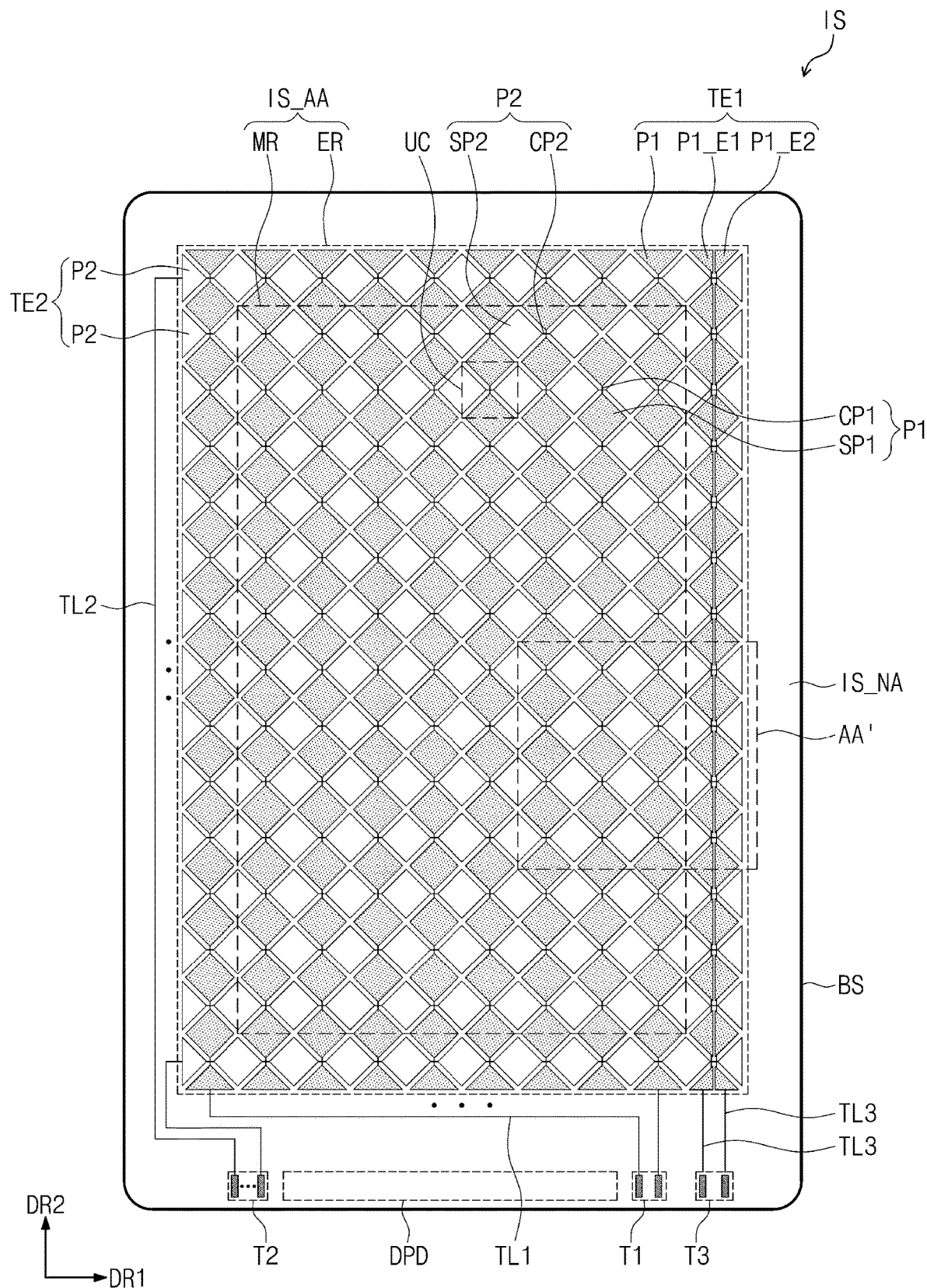
FIG. 5A is a plan view of an input sensor according to an embodiment of the present disclosure.
Figure 5B:
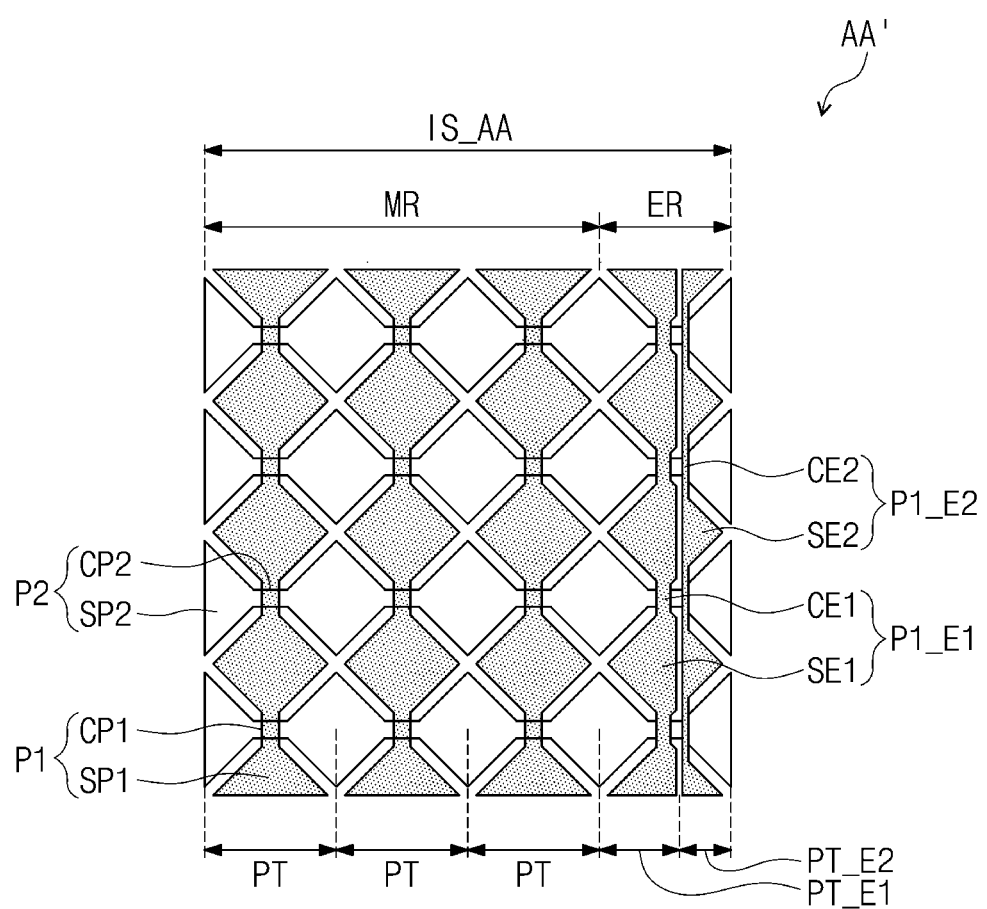
FIG. 5B is an enlarged plan view illustrating the area AA' illustrated in FIG. 5A.

FIG. 5A is a plan view of an input sensor according to an embodiment of the present disclosure. FIG. 5B is an enlarged plan view illustrating the area AA' illustrated in FIG. 5A. Hereinafter, an embodiment of the present disclosure will be described with reference to FIG. 5A and FIG. 5B. Meanwhile, components the same as the components described with reference to FIG. 1A to FIG. 4 are denoted by the same reference numerals, and a duplicate description thereof will not be given.

As illustrated in FIG. 5A, the input sensor IS may include a base substrate BS, a first sensing electrode TE1, a second sensing electrode TE2, a plurality of sensing lines TL1, TL2, and TL3, and sensing pads T1, T2, and T3.

Various materials, such as a transparent substrate, an insulating substrate, a film, and/or glass, may be applied to the base substrate BS as long as the materials may be employed as a base layer on which a conductive pattern may be formed. Alternatively, the base substrate BS may be the display panel DP (see FIG. 2C), and is not limited to any one embodiment.

The first sensing electrode TE1 and the second sensing electrode TE2 are located in an active area IS_AA. The input sensor IS may obtain information about the touch TC through a change in capacitance between the first sensing electrode TE1 and the second sensing electrode TE2.

The active area IS_AA may include a main area MR and an edge area ER. The main area MR may be an area defined as being closer to the center of the input sensor IS than the edge area ER. The main area MR may be an area in which three or more sensing pitches PT (e.g., see FIG. 5B) are present, the sensing pitches PT being maintained to have the same size.

In an embodiment, one of the sensing pitches PT may correspond to a width of a unit sensing area. For example, a unit sensing area UC of an embodiment is marked in FIG. 5A as a square shape in a corresponding area among an area where the first sensing electrode TE1 crosses the second sensing electrode TE2.

In the unit sensing area UC, a sensing pitch in the first direction DR1 may be defined as a width in the first direction DR1 of a corresponding one of first sensor parts SP1, and a sensing pitch in the second direction DR2 may be defined as a width in the second direction DR2 of a corresponding one of second sensor parts SP2. In an embodiment, the sensing pitches PT and sensing pitches PT_E1 and PT_E2 may be sensing pitches in the first direction DR1.

Meanwhile, although the unit sensing area UC is illustrated as centering on a crossing region of the first sensing electrode TE1 and the second sensing electrode TE2 in an embodiment, this is illustrated only as an example, and the unit sensing area UC may be defined in an area where edges of the first sensing electrode TE1 and the second sensing electrode TE2 face each other, and is not limited to any one embodiment.

The edge area ER may be an area surrounding the main area MR. The edge area ER may be an area having a width corresponding to one of the sensing pitches PT. There may be two sensing pitches PT_E1 and PT_E2 in the edge area ER, and the sensing pitches PT_E1 and PT_E2 may have the same or different sizes. The sensing pitches PT_E1 and PT_E2 of the edge area ER may have smaller sizes than the sensing pitches PT of the main area MR.

The first sensing electrode TE1 may include a plurality of first patterns P1, a first edge pattern P1_E1, and a second edge pattern P1_E2. The plurality of first patterns P1, the first edge pattern P1_E1, and the second edge pattern P1_E2 are arranged in the first direction DR1 and each extend in the second direction DR2.

The first patterns P1 are located in the main area MR of the active area IS_AA. Each of the first patterns P1 includes first sensor parts SP1 and first connection parts CP1. The first sensor parts SP1 are arranged to be spaced apart in the second direction DR2.

The first sensor parts SP1 each have a plurality of sides facing the second sensing electrode TE2. In an embodiment, the shape of each of the first sensor parts SP1 is illustrated as a rhombus shape having four sides. However, this is illustrated by way of example, and the first sensor parts SP1 may have various shapes and are not limited to any one embodiment.

Each of the first connection parts CP1 extends in the second direction DR2. Each of the first connection parts CP1 is located between two corresponding first sensor parts SP1 to electrically connect the two first sensor parts SP1. In an embodiment, the first connection parts CP1 and the first sensor parts SP1 are illustrated to have an integral shape. However, this is illustrated only as an example, and in the input sensor IS according to an embodiment of the present disclosure, the first connection parts CP1 may be formed through a process that is independent of that of the first sensor parts SP1, or may be located on a different layer to be connected to the first sensor parts SP1 through a contact hole(s) or the like, and are not limited to any one embodiment.

The first edge pattern P1_E1 and the second edge pattern P1_E2 are located outside the first patterns P1. The first edge pattern P1_E1 and the second edge pattern P1_E2 have shapes and planar surface areas that are respectively different from a shape and a planar surface area of each of the first patterns P1. The planar surface area of each of the first and second edge patterns P1_E1 and P1_E2 may be smaller than the planar surface area of each of the first patterns P1.

The first edge pattern P1_E1 may include a plurality of first edge sensor parts SE1 and a plurality of first edge connection parts CE1. The first edge sensor parts SE1 are arranged to be spaced apart in the second direction DR2.

The first edge sensor parts SE1 have sides facing the second sensing electrode TE2 and one or more sides facing second edge sensor parts SE2. In an embodiment, for example, each of the first edge sensor parts SE1 is illustrated as a polygonal shape including two sides facing the second sensing electrode TE2, and one side facing a corresponding one of the second edge sensor parts SE2. However, this is illustrated only as an example, and the first edge sensor parts SE1 may have various shapes and are not limited to any one embodiment.

A planar surface area of each of the first edge sensor parts SE1 may be smaller than a planar surface area of each of the first sensor parts SP1. A width of each of the first edge sensor parts SE1 may be smaller than a width of each of the first sensor parts SP1.

Each of the first edge connection parts CE1 extends in the second direction DR2. Each of the first edge connection parts CE1 is located between two adjacent first edge sensor parts SE1 to electrically connect the two adjacent first edge sensor parts SE1. In an embodiment, the first edge connection parts CE1 and the first edge sensor parts SE1 are illustrated to have an integral shape. However, this is illustrated only as an example, and in the input sensor IS according to an embodiment of the present disclosure, the first edge connection parts CE1 may be formed through a process that is independent of that of the first edge sensor parts SE1, or may be located on a different layer to be connected to the first edge sensor parts SE1 through a contact hole(s) or the like, and are not limited to any one embodiment.

The second edge pattern P1_E2 may include the plurality of second edge sensor parts SE2 and a plurality of second edge connection parts CE2. The second edge sensor parts SE2 are arranged to be spaced apart in the second direction DR2.

The second edge sensor parts SE2 have sides facing the second sensing electrode TE2 and one or more sides facing the first edge sensor parts SE1. In an embodiment, for example, each of the second edge sensor parts SE2 is illustrated as a polygonal shape including two sides facing the second sensing electrode TE2 and one side facing a corresponding one of the first edge sensor parts SE1. However, this is illustrated only as an example, and the second edge sensor parts SE2 may have various shapes and are not limited to any one embodiment.

A planar surface area of each of the second edge sensor parts SE2 may be smaller than the planar surface area of each of the first sensor parts SP1. A width of each of the second edge sensor parts SE2 may be smaller than the width of each of the first sensor parts SP1. In an embodiment, the width of the sensor part may correspond to the sensing pitch.

Each of the second edge connection parts CE2 extends in the second direction DR2. Each of the second edge connection parts CE2 is located between two adjacent second edge sensor parts SE2 to electrically connect the two adjacent second edge sensor parts SE2. In an embodiment, the second edge connection parts CE2 and the second edge sensor parts SE2 are illustrated to have an integral shape. However, this is illustrated only as an example, and in the input sensor IS according to an embodiment of the present disclosure, the second edge connection parts CE2 may be formed through a process that is independent of that of the second edge sensor parts SE2, or may be located on a different layer to be connected to the second edge sensor parts SE2 through a contact hole(s) or the like, and are not limited to any one embodiment.

The first edge sensor parts SE1 and the second edge sensor parts SE2 have shapes that are different from a shape of the first sensor parts SP1. Each of the first edge sensor parts SE1 and each of the second edge sensor parts SE2 may have shapes having smaller planar surface areas than each of the first sensor parts SP1. In an embodiment, one of the first edge sensor parts SE1 and one of the second edge sensor parts SE2 may respectively have shapes obtained by dividing one of the first sensor parts SP1. That is, a shape obtained by combining the one of the first edge sensor parts SE1 and the one of the second edge sensor parts SE2 may correspond to a shape of the one of the first sensor parts SP1. However, this is illustrated only as an example, and as long as the first edge sensor parts SE1 and the second edge sensor parts SE2 are located in the edge area ER and are capable of forming an electric field with the second sensing electrode TE2, the first edge sensor parts SE1 and the second edge sensor parts SE2 may have various shapes and are not limited to any one embodiment.

The second sensing electrode TE2 may include a plurality of second patterns P2. The second patterns P2 are arranged in the second direction DR2, and each extend in the first direction DR1. The second patterns P2 are located to overlap both the main area MR and the edge area ER. Each of the second patterns P2 includes the second sensor parts SP2 and second connection parts CP2. The second sensor parts SP2 are arranged to be spaced apart in the first direction DR1.

The second sensor parts SP2 each have a plurality of sides facing the first sensing electrode TE1. In an embodiment, the shape of each of the second sensor parts SP2 is illustrated as a rhombus shape corresponding to the shape of each of the first sensor parts SP1. However, this is illustrated by way of example, and each of the second sensor parts SP2 may have various shapes and is not limited to any one embodiment.

Each of the second connection parts CP2 extends in the first direction DR1. Each of the second connection parts CP2 is located between two respective adjacent second sensor parts SP2 to electrically connect the two adjacent second sensor parts SP2. In an embodiment, the second connection parts CP2 and the second sensor parts SP2 are illustrated to have an integral shape. However, this is illustrated only as an example, and in the input sensor IS according to an embodiment of the present disclosure, the second connection parts CP2 may be formed through a process that is independent of that of the second sensor parts SP2, or may be located on a different layer to be connected to the second sensor parts SP2 through a contact hole(s) or the like, and are not limited to any one embodiment.

The sensing lines TL1, TL2, and TL3 are located in a peripheral area IS_NA. The sensing lines TL1, TL2, and TL3 may include first sensing lines TL1, second sensing lines TL2, and third sensing lines TL3.

The first sensing lines TL1 are respectively connected to the first patterns P1 of the first sensing electrode TE1. In an embodiment, the first sensing lines TL1 are respectively connected to lower ends among the respective pairs of ends of the first patterns P1. The second sensing lines TL2 are respectively connected to one ends of the second patterns P2 of the second sensing electrode TE2 (e.g., connected to ends of the second patterns P2 at one side thereof). In an embodiment, the second sensing lines TL2 are respectively connected to left ends among the ends of the second patterns P2 of the second sensing electrode TE2. The third sensing lines TL3 are respectively connected to the first and second edge patterns P1_E1 and P1_E2 of the first sensing electrode TE1.

The sensing pads T1, T2, and T3 are located in the peripheral area IS_NA. The sensing pads T1, T2, and T3 may include first sensing pads T1, second sensing pads T2, and third sensing pads T3. The first sensing pads T1 are respectively connected to the first sensing lines TL1, the second sensing pads T2 are respectively connected to the second sensing lines TL2, and the third sensing pads T3 are respectively connected to the third sensing lines TL3. Through the first and third sensing pads T1 and T3, the first sensing electrode TE1 may receive an external signal or may output a sensing signal to the outside. Similarly, through the second sensing pads T2, the second sensing electrode TE2 may receive an external signal or may output a sensing signal to the outside.

As described above, the input sensor IS senses an external input through a change in capacitance between the first sensing electrode TE1 and the second sensing electrode TE2. In an embodiment of the present disclosure, external input sensing in the main area MR may be performed through a change in capacitance between the first patterns P1 and the second patterns P2. For the main area MR, substantially the same sensing pitches PT are defined for the entirety of the area, and thus even, or consistent, sensitivity may be provided for the entirety of the area.

External input sensing in the edge area ER may be performed through changes in capacitance between the first edge pattern P1_E1 and the second patterns P2, and between the second edge pattern P1_E2 and the second patterns P2. At least two sensing pitches PT_E1 and PT_E2 may be defined in the edge area ER. The sensing pitches PT_E1 and PT_E2 of the edge area ER may be substantially smaller than the sensing pitches PT of the main area MR. In an embodiment, the sum of the sensing pitches PT_E1 and PT_E2 of the edge area ER may substantially correspond to one of the sensing pitches PT of the main area MR.

According to an embodiment of the present disclosure, two or more sensing pitches may be provided in the edge area ER by dividing one sensing pitch into the two or more sensing pitches. A sensing area in the edge area ER may be an area where edges of the first edge pattern P1_E1 and the second sensing electrode TE2 face each other. The sensing pitches PT_E1 and PT_E2 of the edge area ER may be smaller than each of the sensing pitches PT of the main area MR. However, for the same surface area, more sensing pitches PT_E1 and PT_E2 may be secured in the edge area ER than in the main area MR. According to an embodiment of the present disclosure, by dividing the electrode used for sensing within the same area, the sensing pitches may be smaller, and thus the accuracy of sensing may be improved in the edge area.

Figure 6A:
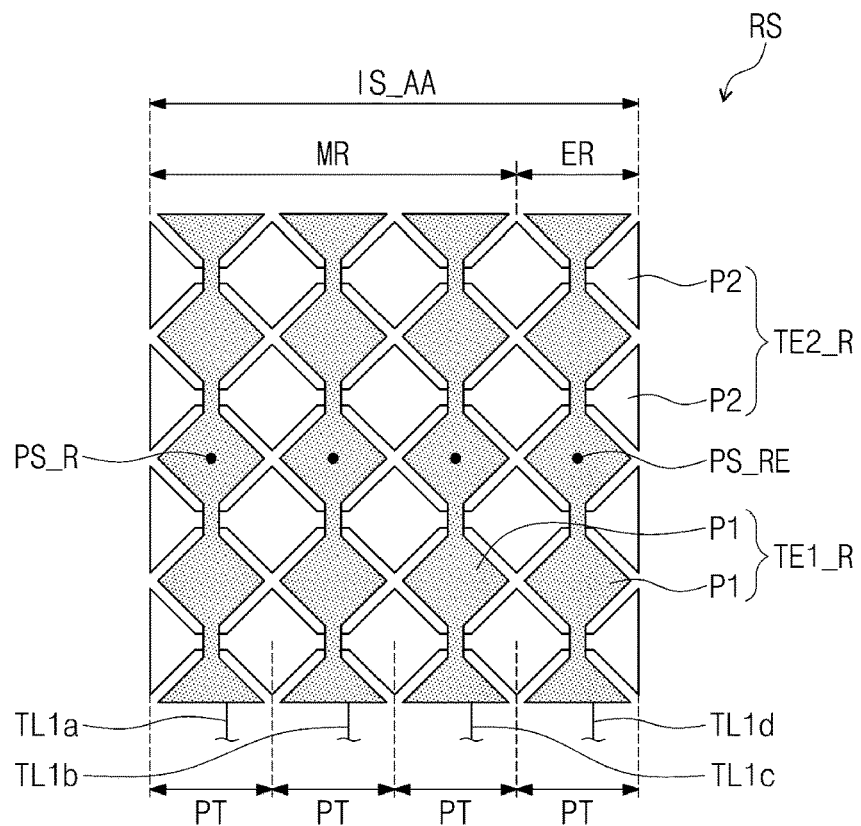
FIG. 6A is a plan view illustrating a partial area of an input sensor according to a comparative embodiment.
Figure 6B:
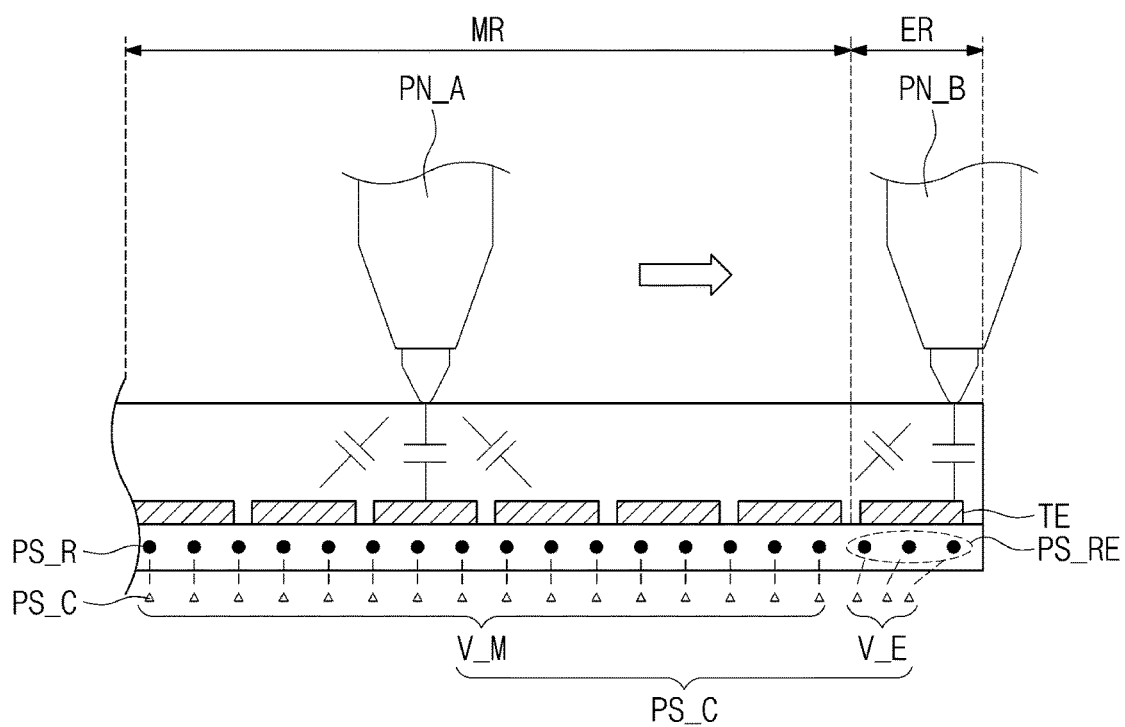
FIG. 6B is a cross-sectional view of an input sensor according to a comparative embodiment.
Figure 7A:
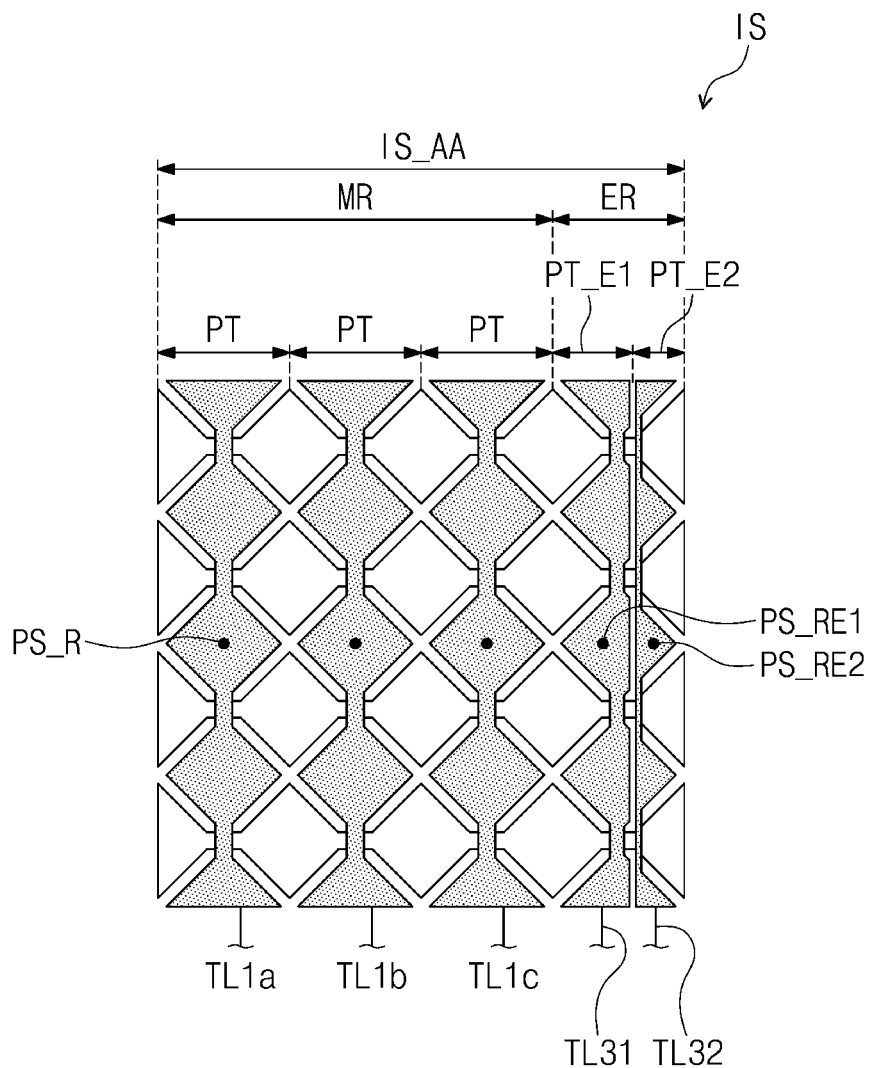
FIG. 7A is a plan view illustrating a partial area of an input sensor according to an embodiment of the present disclosure.
Figure 7B:
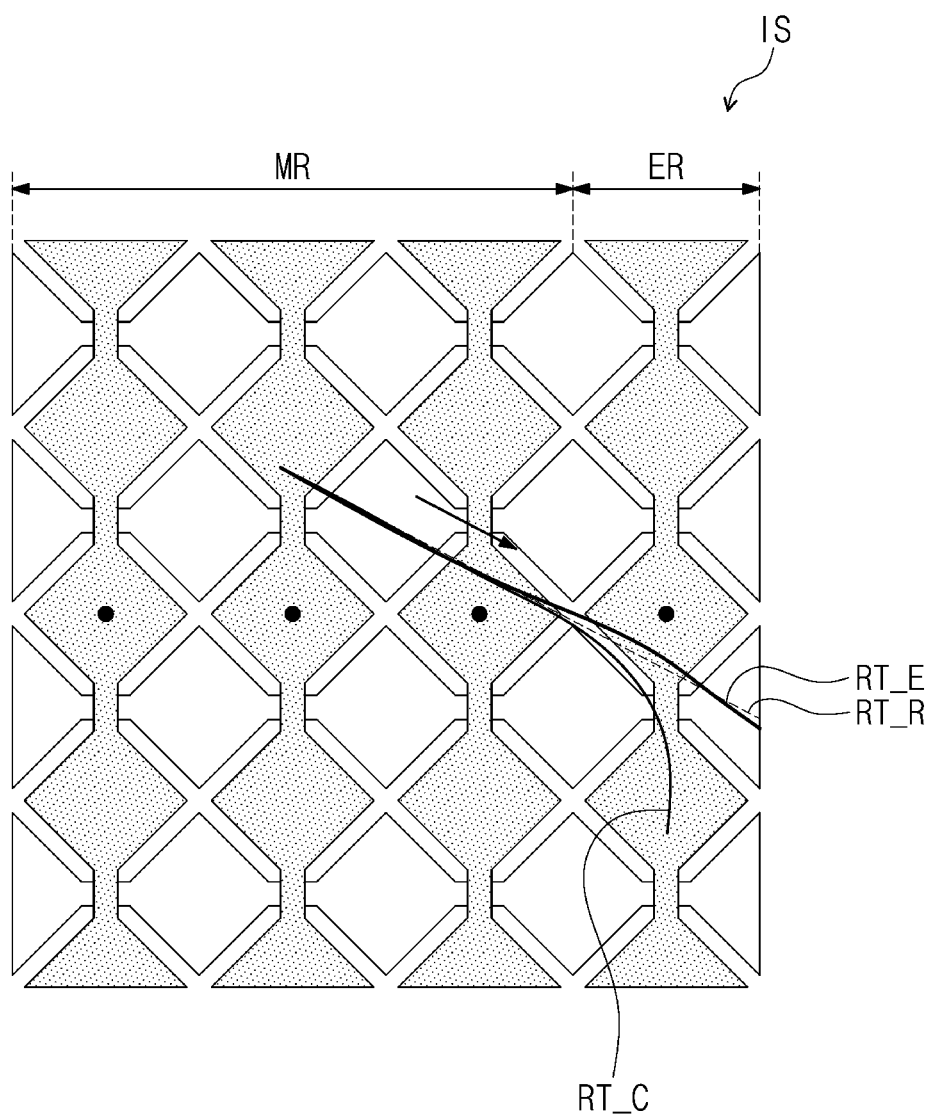
FIG. 7B is a schematic diagram of an input sensor.

FIG. 6A is a plan view illustrating a partial area of an input sensor according to comparative embodiments. FIG. 6B is a cross-sectional view of an input sensor according to comparative embodiments. FIG. 7A is a plan view illustrating a partial area of an input sensor according to an embodiment of the present disclosure. FIG. 7B is a schematic diagram of an input sensor. Hereinafter, an embodiment of the present disclosure will be described with reference to FIG. 6A to FIG. 7B.

As illustrated in FIG. 6A and FIG. 6B, comparative embodiments RS may include first and second sensing electrodes TE1_R and TE2_R respectively corresponding to the first and second sensing electrodes TE1 and TE2 of an embodiment of the present disclosure, and does not include the first edge pattern P1_E1 or the second edge pattern P1_E2. That is, the first sensing electrode TE1_R of the comparative embodiments RS include only a plurality of first patterns P1, and the second sensing electrode TE2_R includes only a plurality of second patterns P2.

The comparative embodiments RS may have one sensing pitch PT in an edge area ER. In this case, the sensing pitch PT of the edge area ER may be substantially the same as each of sensing pitches PT of a main area MR.

FIG. 6B illustrates a case in which an external input is applied by a pen. A pen PN_A inputted to the main area MR may form capacitance with a sensing electrode TE, and position coordinates at which the pen PN_A is inputted may be calculated through the capacitance formed as described above. In contrast, a pen PN_B inputted to the edge area ER by moving the pen may also form capacitance with the sensing electrode TE, but the number of the patterns forming the capacitance is relatively small. For example, as illustrated in FIG. 6B, the pen PN_A inputted to the main area MR forms the capacitance with three patterns, but the pen PN_B inputted to the edge area ER forms the capacitance with two patterns. Accordingly, capacitance information for obtaining coordinate information of the pen PN_B inputted to the edge area ER may be insufficient compared with a case in the main area MR.

In FIG. 6B, physical positions PS_R of an external input applied to the input sensor are illustrated as points/circles, and calculated positions PS_C obtained therethrough are illustrated as triangles. According thereto, calculated values V_M obtained in the main area MR may be values substantially coincident with the physical positions PS_R of the external input, but calculated values V_E obtained in the edge area ER may be values substantially different from the physical positions PS_RE of the external input. That is, there may occur an error or distortion in calculating a coordinate value for an external input PS_RE applied to the edge area ER among the physical positions PS_R.

As illustrated in FIG. 7A, the input sensor IS according to an embodiment of the present disclosure may provide the sensing pitches PT_E1 and PT_E2, which are two or more divided sensing pitches, in the edge area ER. In the same area, the first sensing electrode TE1_R of the comparative embodiments RS shown in FIG. 6A may be connected to four sensing lines TL1a to TL1d, and the first sensing electrode TE1 of the input sensor IS according to an embodiment of the present disclosure may be connected to five sensing lines TL1a, TL1b, TL1c, TL31, and TL32, as shown in FIG. 7A. Accordingly, the input sensor IS may produce an effect of sensing an external input at five positions in the same area. Accordingly, precise sensing may be possible in the same area.

For example, regarding information of positions inputted to the edge area ER, two positions PS_RE1 and PS_RE2 may be distinguished from each other to be sensed. Due to the division of the pattern for sensing in the edge area ER, the number of sensing pitches increases in the edge area ER. Accordingly, sensitivity may be improved in the edge area ER.

Referring to FIG. 7B, the input sensor IS is illustrated to correspond to the comparative embodiments RS for easy comparison. FIG. 7B illustrates an actual movement path RT_R of an external input together with coordinate information RT_C calculated in the comparative embodiments RS, and coordinate information RT_E calculated in the input sensor according to an embodiment of the present disclosure. As illustrated in FIG. 7B, when the actual movement path RT_R of the external input proceeds in a direction of the corresponding arrow shown in FIG. 7B, it may be seen that, in the edge area ER, the coordinate information RT_C calculated in the comparative embodiments RS deviates from the actual movement path RT_R of the external input with a relatively large difference therebetween. In contrast, it may be seen that, in the edge area ER, the coordinate information RT_E calculated in the input sensor according to an embodiment of the present disclosure is substantially similar to the actual movement path RT_R of the external input.

According to an embodiment of the present disclosure, sensitivity in the edge area ER may be improved by subdividing the pattern of the sensing electrode for external input sensing in the edge area ER, and by increasing the number of sensing pitches. Accordingly, it is possible to provide an electronic device that provides even sensitivity in the main area MR and the edge area ER.

Figure 8A:
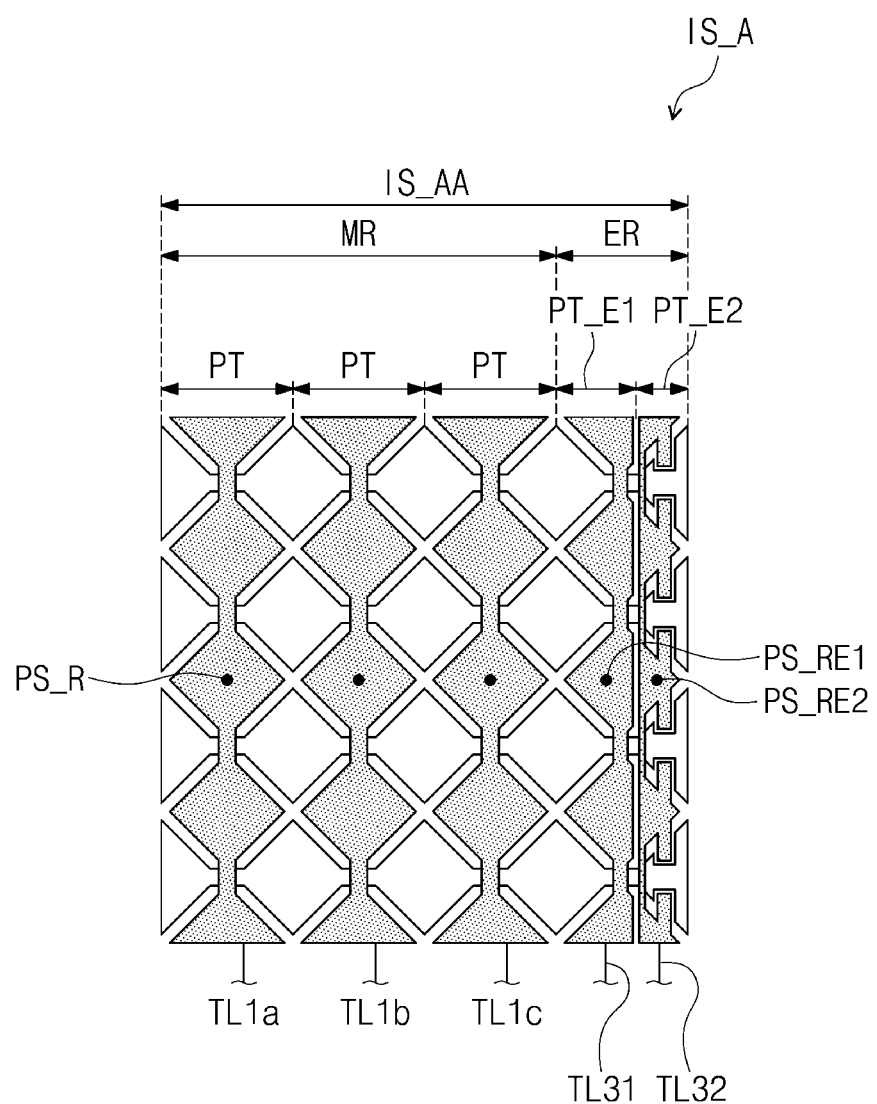
FIG. 8A and FIG. 8B are plan views illustrating portions of input sensors according to embodiments of the present disclosure.
Figure 8B:
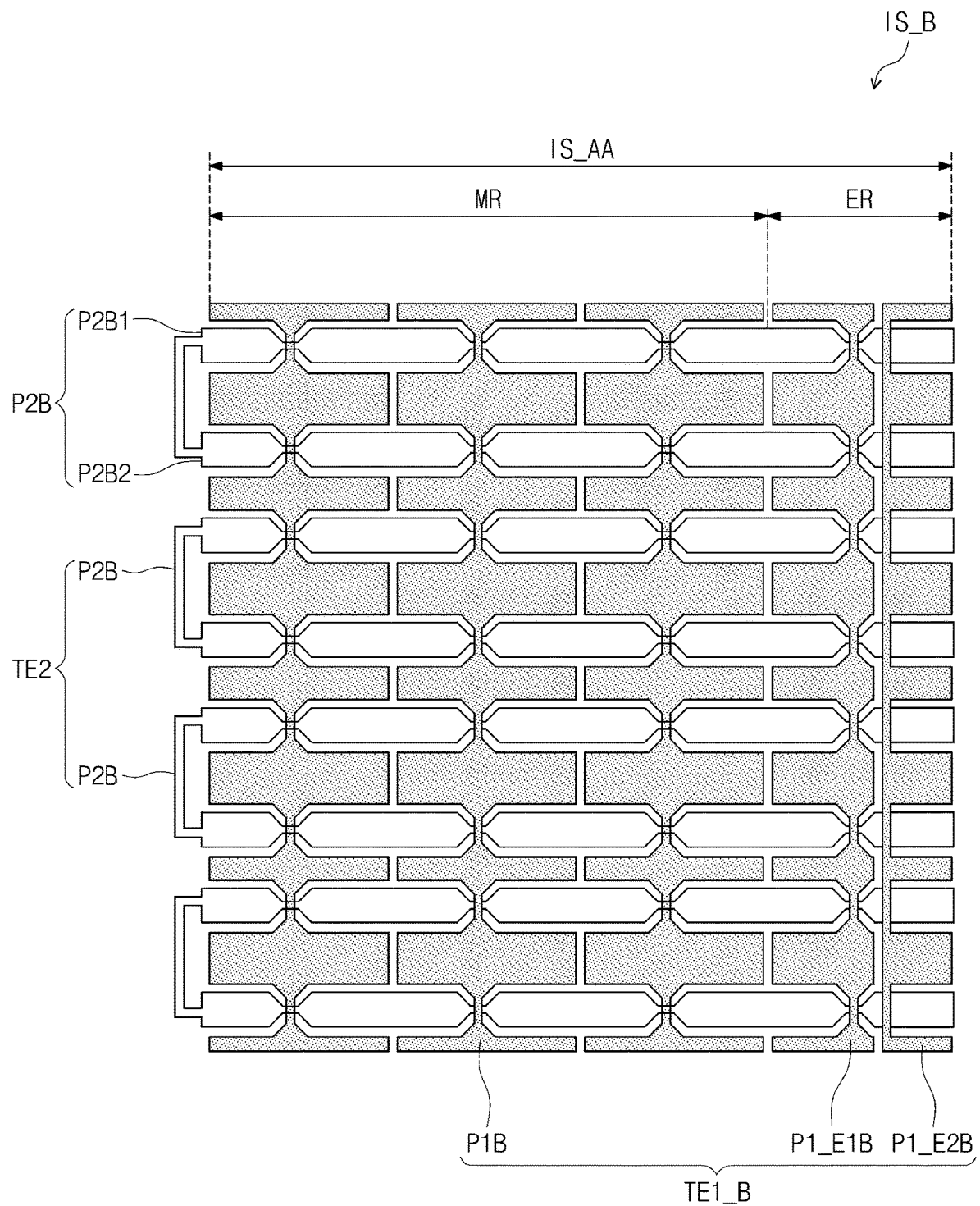

FIG. 8A and FIG. 8B are plan views illustrating portions of input sensors according to embodiments of the present disclosure. FIG. 8A and FIG. 8B illustrate areas corresponding to the area of FIG. 7A. Hereinafter, an embodiment of the present disclosure will be described with reference to FIG. 8A and FIG. 8B. Meanwhile, components the same as the components described with reference to FIG. 1A to FIG. 7B are denoted by the same reference numerals, and a duplicate description thereof will not be given.

As illustrated in FIG. 8A, a first edge pattern PT_E1 and a second edge pattern PT_E2 may have different shapes in an input sensor IS_A. Accordingly, a shape of a sensing area between the first edge pattern PT_E1 and a second sensing electrode TE2 may be different from a shape of a sensing area between the second edge pattern PT_E2 and the second sensing electrode TE2. Sensitivity for an external input may be improved as a sensing area formed facing the second sensing electrode TE2 increases. According to an embodiment of the present disclosure, sensitivity in an edge area ER may be easily controlled by independently designing the shapes of the first edge pattern PT_E1 and the second edge pattern PT_E2.

Alternatively, as illustrated in FIG. 8B, an input sensor IS_B may include a first sensing electrode TE1_B and a second sensing electrode TE2 having various shapes. The first sensing electrode TE1_B may include a plurality of first patterns P1B, a first edge pattern P1_E1B, and a second edge pattern P1_E2B. The second sensing electrode TE2 may include a plurality of second patterns P2B. Each of the second patterns P2B may include a plurality of sub-patterns P2B1 and P2B2 located to be separated from each other in an active area IS_AA and connected to each other outside the active area IS_AA. The input sensor IS_B may increase a sensing area in a main area MR by including the second sensing electrode TE2 including the sub-patterns P2B1 and P2B2.

The first edge pattern P1_E1B and the second edge pattern P1_E2B may be applied regardless of the shape of the first sensing electrode TE1_B or the second sensing electrode TE2. The first edge pattern P1_E1B and the second edge pattern P1_E2B may be provided in various shapes and in various numbers as long as the number of sensing pitches (e.g., per unit area) may be larger in an edge area ER than in the main area MR, and the first edge pattern P1_E1B and the second edge pattern P1_E2B are not limited to any one embodiment.

Figure 9:
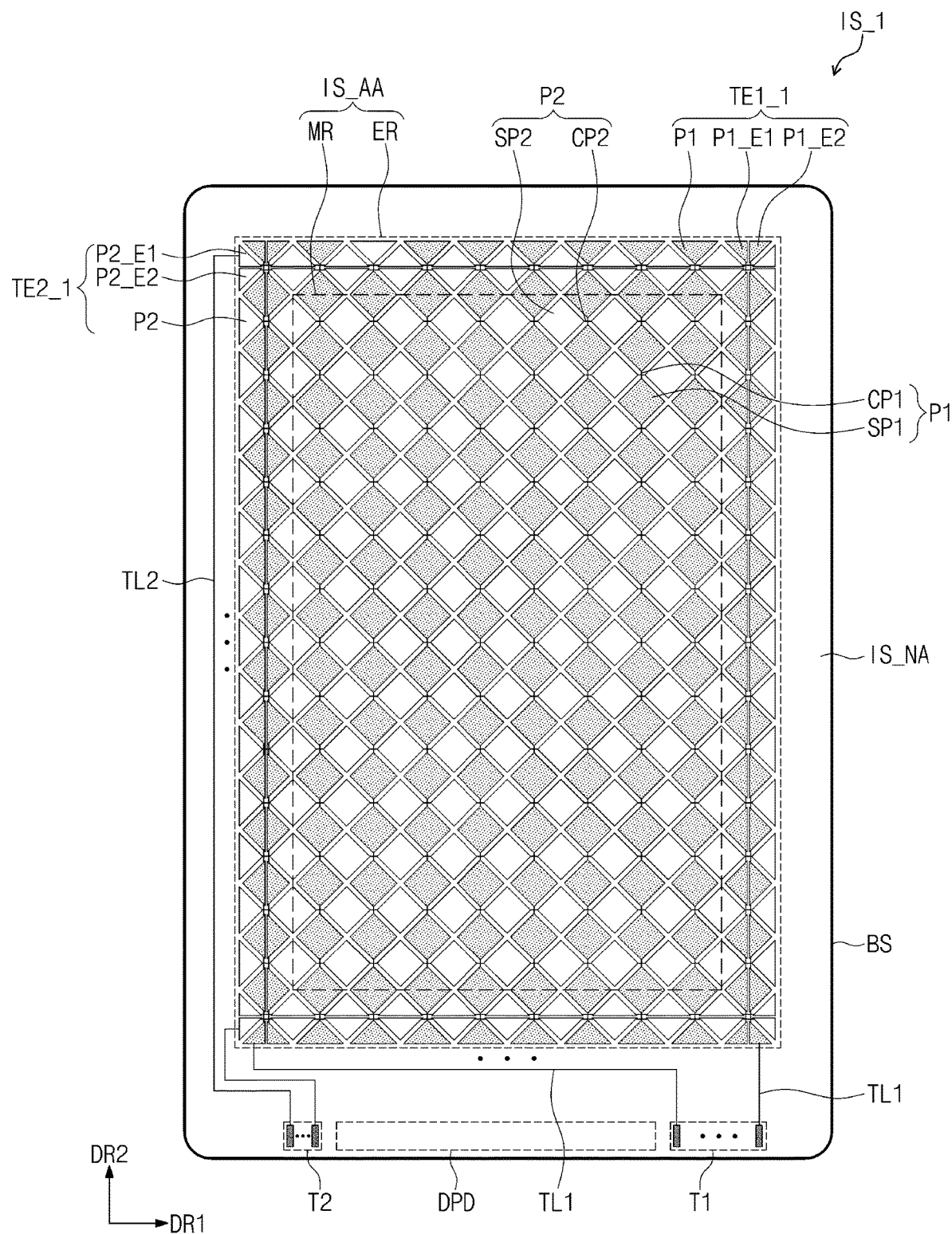
FIG. 9 is a plan view of an input sensor according to an embodiment of the present disclosure.

FIG. 9 is a plan view of an input sensor according to an embodiment of the present disclosure. FIG. 9 illustrates an area corresponding to the area of FIG. 5A. Hereinafter, an embodiment of the present disclosure will be described with reference to FIG. 9. Meanwhile, components the same as the components described with reference to FIG. 1A to FIG. 8B are denoted by the same reference numerals, and a duplicate description thereof will not be given.

As illustrated in FIG. 9, an input sensor IS_1 may include a first sensing electrode TE1_1 and a second sensing electrode TE2_1. The first sensing electrode TE1_1 may include a plurality of first patterns P1 located in a main area MR, and a first edge pattern P1_E1 and a second edge pattern P1_E2 that are located in an edge area ER. Each of the first edge pattern P1_E1 and the second edge pattern P1_E2 may be provided in plurality, and the first edge patterns P1_E1 and the second edge patterns P1_E2 may be respectively located in left and right portions of the edge area ER that is present on the left and right of the main area MR.

The second sensing electrode TE2_1 may include a plurality of second patterns P2 located in the main area MR, and a third edge pattern P2_E1 and a fourth edge pattern P2_E2 that are located in the edge area ER. Each of the third edge pattern P2_E1 and the fourth edge pattern P2_E2 may be provided in plurality, and the third edge patterns P2_E1 and the fourth edge patterns P2_E2 may be respectively located in upper and lower portions of the edge area ER that is present adjacent to upper and lower portions of the main area MR.

According to an embodiment of the present disclosure, the input sensor IS_1 may include the edge patterns P1_E1, P1_E2, P2_E1, and P2_E2 that are located in the entirety of the edge area ER. Accordingly, subdivided sensing pitches may be provided in the entirety of the edge area ER compared with the case of the main area MR, and sensitivity of the edge area ER may be improved.

According to an embodiment of the present disclosure, an electronic device with improved sensitivity in the edge area may be provided. In addition, according to an embodiment of the present disclosure, it is possible to provide even (e.g., substantially consistent) sensitivity across the entirety of the active area.

Although an embodiment of the present disclosure have been described herein, it is understood that various changes and modifications can be made by those skilled in the art within the spirit and scope of the present disclosure defined by the following claims or the equivalents. Therefore, the embodiments described herein are not intended to limit the technical spirit and scope of the present disclosure, and all technical spirit within the scope of the following claims or the equivalents thereof will be construed as being included in the scope of the present disclosure.

What is claimed is:

1. An electronic device comprising:
 a first sensing electrode in an active area;
 a second sensing electrode in the active area, and configured to form capacitance with the first sensing electrode; and
 sensing lines in a peripheral area adjacent to the active area, and respectively connected to the first sensing electrode and the second sensing electrode,
 wherein the first sensing electrode comprises:
   first patterns in a main area of the active area, arranged in a first direction, and extending in a second direction crossing the first direction;
   a first edge pattern in an edge area of the active area that is between the main area and the peripheral area, is spaced apart from the first patterns in the first direction, and extends in the second direction; and
   a second edge pattern that is in the edge area, is spaced apart from the first edge pattern in the first direction, and extends in the second direction, and
 wherein a planar surface area of each of the first and second edge patterns is less than a planar surface area of each of the first patterns.

2. The electronic device of claim 1, wherein the second sensing electrode comprises second patterns in the main area that are configured to form capacitance with the first patterns, the first edge pattern, and the second edge pattern.

3. The electronic device of claim 2, wherein the sensing lines are respectively connected to the first patterns, the second patterns, the first edge pattern, and the second edge pattern.

4. The electronic device of claim 2, wherein the second sensing electrode further comprises a third edge pattern and a fourth edge pattern that are in the edge area, that are spaced apart from the second patterns, and that each have a planar surface area that is less than a planar surface area of each of the second patterns.

5. The electronic device of claim 1, wherein the first edge pattern has a different shape from that of the second edge pattern.

6. The electronic device of claim 1, wherein the first patterns comprise first sensor parts arranged in the second direction and first connection parts respectively connecting the first sensor parts,
 wherein the first edge pattern comprises first edge sensor parts arranged in the second direction, and first edge connection parts respectively connecting the first edge sensor parts,
 wherein the second edge pattern comprises second edge sensor parts arranged in the second direction, and second edge connection parts respectively connecting the second edge sensor parts, and
 wherein a sum of a width in the first direction of one of the first edge sensor parts and a width in the first direction of one of the second edge sensor parts is substantially equal to a width in the first direction of one of the first sensor parts.

7. The electronic device of claim 6, wherein the first sensor parts and the first connection parts are at a same layer.

8. The electronic device of claim 6, wherein the first sensor parts and the first connection parts are at respective layers and are connected to each other through a respective contact hole.

9. The electronic device of claim 1, wherein the sensing lines are respectively connected to ends of the first patterns, one end of the first edge pattern, and one end of the second edge pattern.

10. The electronic device of claim 1, wherein the first sensing electrode and the second sensing electrode respectively comprise a mesh-shaped conductive pattern.

11. The electronic device of claim 1, further comprising a display panel comprising pixels overlapping the active area.

12. An electronic device comprising:
 a display panel comprising pixels; and
 an input sensor that is configured to sense an external input, and comprises a first sensing electrode and a second sensing electrode that overlap the pixels when viewed in a plane, and that are configured to form mutual capacitance, wherein the first sensing electrode comprises:
first patterns arranged in a first direction, and extending in a second direction crossing the first direction;
a first edge pattern spaced apart from the first patterns in the first direction, and configured to receive a signal independent of a signal of the first patterns; and
a second edge pattern spaced apart from the first edge pattern in the first direction, and configured to receive a signal independent of the signal of the first edge pattern, and
wherein a width in the first direction of an area in which the first edge pattern and the second edge pattern are located is substantially equal to a width in the first direction of an area in which one of the first patterns is located.

13. The electronic device of claim 12, wherein the external input comprises at least one of a user's hand or an electromagnetic pen.

14. The electronic device of claim 12, wherein the second sensing electrode comprises second patterns that are arranged in the second direction, and that extend in the first direction.

15. The electronic device of claim 14, wherein the second sensing electrode further comprises:
a third edge pattern that is spaced apart from the second patterns in the second direction, extends in the first direction, and is configured to receive a signal independent of a signal of the second patterns; and
a fourth edge pattern that is spaced apart from the third edge pattern in the second direction, extends in the first direction, and is configured to receive a signal independent of the signal of the third edge pattern.

16. The electronic device of claim 12, wherein the first patterns comprise first sensor parts arranged in the second direction, and first connection parts connecting the first sensor parts,
wherein the first edge pattern comprises first edge sensor parts arranged in the second direction, and first edge connection parts connecting the first edge sensor parts, and
wherein the second edge pattern comprises second edge sensor parts arranged in the second direction, and second edge connection parts connecting the second edge sensor parts, and
wherein a sum of a width in the first direction of one of the first edge sensor parts and a width in the first direction of one of the second edge sensor parts is substantially equal to a width in the first direction of one of the first sensor parts.

17. The electronic device of claim 16, wherein the first sensor parts and the first connection parts are at a same layer.

18. The electronic device of claim 16, wherein the first sensor parts and the first connection parts are at different layers to be connected to each other through a respective contact hole.

19. The electronic device of claim 16, wherein the first edge sensor parts and the second edge sensor parts have different shapes from each other.

20. The electronic device of claim 16, wherein a planar surface area of one of the first edge sensor parts and a planar surface area of one of the second edge sensor parts are less than a planar surface area of one of the first sensor parts.

* * * * *